US009325961B2

(12) United States Patent
Suzuki et al.

(10) Patent No.: US 9,325,961 B2
(45) Date of Patent: Apr. 26, 2016

(54) COMPUTER-READABLE STORAGE MEDIUM HAVING INFORMATION PROCESSING PROGRAM STORED THEREIN, INFORMATION PROCESSING METHOD, INFORMATION PROCESSING APPARATUS, AND INFORMATION PROCESSING SYSTEM

(75) Inventors: Toshiaki Suzuki, Kyoto (JP); Keizo Ohta, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 971 days.

(21) Appl. No.: 13/048,245

(22) Filed: Mar. 15, 2011

(65) Prior Publication Data

US 2012/0176369 A1 Jul. 12, 2012

(30) Foreign Application Priority Data

Jan. 7, 2011 (JP) ................. 2011-002187

(51) Int. Cl.
| | |
|---|---|
| H04N 13/00 | (2006.01) |
| H04N 13/02 | (2006.01) |
| H04N 13/04 | (2006.01) |
| G06T 15/00 | (2011.01) |

(52) U.S. Cl.
CPC ....... *H04N 13/0014* (2013.01); *H04N 13/0278* (2013.01); *H04N 13/0402* (2013.01); *H04N 13/0497* (2013.01); *G06T 15/00* (2013.01)

(58) Field of Classification Search
USPC .......................................... 345/419
See application file for complete search history.

(56) References Cited

U.S. PATENT DOCUMENTS

| | | | |
|---|---|---|---|
| 2003/0179198 A1 | 9/2003 | Uchiyama | |
| 2008/0037863 A1 | 2/2008 | Tooyama et al. | |
| 2010/0053322 A1* | 3/2010 | Marti et al. | 348/135 |
| 2011/0018868 A1* | 1/2011 | Inoue et al. | 345/419 |
| 2011/0018982 A1* | 1/2011 | Shibamiya et al. | 348/54 |
| 2011/0028805 A1* | 2/2011 | Yamazaki | 600/307 |

FOREIGN PATENT DOCUMENTS

| | | |
|---|---|---|
| JP | 2001-22344 | 1/2001 |
| JP | 2001-236521 | 8/2001 |

(Continued)

OTHER PUBLICATIONS

Nov. 12, 2013 Search Report for EP 11159145.9, 10 pages.

(Continued)

*Primary Examiner* — Ming Hon
*Assistant Examiner* — Yu-Jang Tswei
(74) *Attorney, Agent, or Firm* — Nixon & Vanderhye PC

(57) ABSTRACT

A computer-readable storage medium having stored therein an information processing program, an information processing method, an information processing apparatus, and an information processing system which are capable of alleviating a user's uncomfortableness are provided. When a game process is performed by a game apparatus having an LCD on which a display image can be displayed by switching between a planar view display and a stereoscopically visible display, angular velocities of rotations about axes of the game apparatus are detected by using an angular velocity sensor provided in the game apparatus. When at least one of the detected angular velocities of the rotations about the respective axes is greater than or equal to a predetermined angular velocity threshold value, the stereoscopically visible display is switched to the planar view display.

22 Claims, 12 Drawing Sheets

(56) References Cited

FOREIGN PATENT DOCUMENTS

| | | | | |
|---|---|---|---|---|
| JP | 2002-281526 | | 9/2002 | |
| JP | 2002-298160 | * | 10/2002 | ............. G06T 17/40 |
| JP | 2002-300612 | | 10/2002 | |
| JP | 2003-348622 | * | 12/2003 | ............. H04N 13/04 |
| JP | 2005-266293 | | 9/2005 | |
| JP | 2009-211718 | | 9/2009 | |
| JP | WO2010061689 | * | 6/2010 | ............. H04N 13/04 |
| WO | 2010/061689 | | 6/2010 | |

OTHER PUBLICATIONS

Jul. 24, 2012, Notice of Reasons for Rejection for JP 2011-002187, 3 pages.

* cited by examiner

COMPUTER-READABLE STORAGE MEDIUM HAVING INFORMATION PROCESSING PROGRAM STORED THEREIN, INFORMATION PROCESSING METHOD, INFORMATION PROCESSING APPARATUS, AND INFORMATION PROCESSING SYSTEM

CROSS REFERENCE TO RELATED APPLICATION

The disclosure of Japanese Patent Application No. 2011-002187, filed on Jan. 7, 2011, is incorporated herein by reference.

BACKGROUND OF THE INVENTION

1. Field of the Invention

The present invention relates to a computer-readable storage medium having an information processing program stored therein, an information processing method, an information processing apparatus, and an information processing system, and more particularly to a computer-readable storage medium having stored therein an information processing program, an information processing method, an information processing apparatus, and an information processing system which are capable of alleviating a user's uncomfortableness.

2. Description of the Background Art

Some conventional hand-held game apparatuses are each provided with a gyro sensor as disclosed in, for example, Japanese Laid-Open Patent Publication No. 2002-298160 (hereinafter, referred to as a "conventional art"). In the hand-held game apparatus disclosed in the conventional art, when the game apparatus is moved by a user, a rotation angle based on the movement by the user is detected by using the gyro sensor. A virtual camera in a virtual space is moved in accordance with the detected rotation angle, and an image of a virtual object or the like in the virtual space is taken by the virtual camera, thereby generating an image. Thus, in the conventional art, a position of the virtual camera is moved by moving the hand-held game apparatus, and the virtual object viewed from various points of view can be displayed.

However, when the hand-held game apparatus described in the conventional art includes a display device for displaying a stereoscopically visible image, a user may feel uncomfortable in some cases. Specifically, the user needs to view a display screen of the display device from an optimal point of view corresponding to a position at which the image is taken, so as to stereoscopically view the stereoscopically visible image. However, in order to display a virtual object viewed from various points of view by using the hand-held game apparatus described in the conventional art, the hand-held game apparatus needs to be moved. When the hand-held game apparatus is moved, a deviation between a user's point of view and the optimal point of view may occur in some cases. In general, the stereoscopically visible image is viewed in a blurred manner when viewed from a point of view different from the optimal point of view. Namely, when the stereoscopically visible image is displayed by the hand-held game apparatus described above in the conventional art, the display image is viewed in a blurred manner. Therefore, a user may feel uncomfortable in some cases.

SUMMARY OF THE INVENTION

Therefore, an object of the present invention is to provide a computer-readable storage medium having stored therein an information processing program, an information processing method, an information processing apparatus, and an information processing system which are capable of alleviating a user's uncomfortableness.

In order to solve the aforementioned problems, the present invention has the following features.

A computer-readable storage medium having stored therein an information processing program according to the present invention is a computer-readable storage medium having stored therein an information processing program executed by a computer of a hand-held information processing apparatus. The information processing program causes the computer to function as: display control means; movement acquisition means; virtual camera setting means; and switching means. The display control means performs, by using a display device, one of a planar view display and a stereoscopically visible display, to display a display image. The movement acquisition means acquires movement data representing a movement of the information processing apparatus. The virtual camera setting means sets at least one of a position and an imaging direction of a virtual camera disposed in a virtual space in cooperation with the movement of the information processing apparatus which is represented by the movement data. The switching means switches a display of the display image performed by the display control means between the planar view display and the stereoscopically visible display, based on the movement data, and the display image is taken by the virtual camera so as to represent the virtual space.

In the features described above, a user's uncomfortableness can be alleviated which is caused when a deviation occurs between the optimal point of view and a user's point of view for the stereoscopically visible display by the information processing apparatus being moved, and thus a favorable stereoscopically visible display cannot be performed for the user.

In another exemplary configuration, the information processing program may cause the computer to further function as determination means. The determination means determines whether a value represented by the movement data of the information processing apparatus is less than a predetermined value. In this case, the switching means switches the display of the display image performed by the display control means to the planar view display when the determination means determines that the value represented by the movement data is not less than the predetermine value, and the switching means switches the display of the display image performed by the display control means to the stereoscopically visible display when the determination means determines that the value represented by the movement data is less than the predetermined value.

In the features described above, a user's uncomfortableness can be alleviated which is caused when a deviation occurs between the optimal point of view and a user's point of view for the stereoscopically visible display by the information processing apparatus being greatly moved.

In another exemplary configuration, the switching means may switch the display of the display image performed by the display control means by gradually changing from the planar view display to the stereoscopically visible display.

In the features described above, a user's uncomfortableness can be alleviated which is caused when the planar view display is immediately switched to the stereoscopically visible display, and the user cannot adjust his/her focus of eyes in accordance with the immediate switching.

In another exemplary configuration, the display control means may display, as the display image, an image for a left eye and an image for a right eye which have been generated by using the two virtual cameras which are spaced from each other by a predetermined distance in the virtual space when the stereoscopically visible display is performed. In this case, when the switching means switches the display of the display image performed by the display control means by gradually changing from the planar view display to the stereoscopically visible display, the display device may be caused to display, as the display image, a stereoscopically visible image including the image for the left eye and the image for the right eye having been generated, by gradually increasing the distance between the two virtual cameras.

In the features described above, a user's uncomfortableness can be alleviated which is caused when the user uses the information processing apparatus including the display device for performing the stereoscopically visible display by displaying two images having a parallax therebetween.

In another exemplary configuration, the information processing program may cause the computer to further function as calculation means. The calculation means calculates, based on the movement data having been acquired by the movement acquisition means, a rotation angle about an axis of a predetermined direction relative to a predetermined reference direction in a space in which the information processing apparatus exists. In this case, the switching means may switch the display of the display image performed by the display control means between the planar view display and the stereoscopically visible display, based on the rotation angle.

In the features described above, a user's uncomfortableness can be alleviated which is caused when a deviation occurs between the optimal point of view and a user's point of view for the stereoscopically visible display by the user rotating the information processing apparatus about an axis of a predetermined direction.

In another exemplary configuration, the switching means may switch the display of the display image performed by the display control means by gradually changing from the stereoscopically visible display to the planar view display in accordance with the rotation angle increasing.

In the features described above, a user's uncomfortableness can be alleviated by the image display approaching the planar view display in accordance with a deviation increasing between the optimal point of view and a user's point of view for the stereoscopically visible display.

In another exemplary configuration, the information processing program may cause the computer to further function as determination means. The determination means determines whether a value represented by the movement data is less than a predetermined value. In this case, when the determination means determines that the value represented by the movement data is not less than the predetermined value, the switching means may stop switching the display of the display image performed by the display control means based on the rotation angle, and the display control means may perform the planar view display of the display image, and when the determination means determines that the value represented by the movement data is less than the predetermined value, the switching means may recommence switching of the display based on the rotation angle.

In the features described above, for alleviating a user's uncomfortableness, gradual switching from the stereoscopically visible display to the planar view display is performed while switching of display based on the movement of the information processing apparatus is performed.

In another exemplary configuration, the calculation means may recommence calculation with the rotation angle corresponding to the reference direction, when the display control means recommences the switching of the display of the display image based on the rotation angle.

In the features described above, the planar view display can be prevented from being erroneously performed when the rotation angle is changed in accordance with a user changing the orientation in which the information processing apparatus is held.

In another exemplary configuration, the switching means may switch the display of the display image performed by the display control means so as to perform the planar view display when the rotation angle is greater than or equal to a predetermined angle.

In the features described above, it is possible to assuredly eliminate a user's uncomfortableness which is caused when a deviation occurs between the optimal point of view and the user's point of view for the stereoscopically visible display due to a user greatly rotating the information processing apparatus about an axis of the predetermined direction.

In another exemplary configuration, the information processing program may cause the computer to further function as object positioning means. The object positioning means positions a virtual object which is movable in the virtual space. In this case, the display control means may cause the display device to display a display image of the virtual object having been generated by using the virtual camera.

In the features described above, it is possible to alleviate a user's uncomfortableness which is caused when a deviation occurs between the optimal point of view and a user's point of view for the stereoscopically visible display due to a user moving the information processing apparatus so as to follow the moving virtual object.

In another exemplary configuration, the information processing program may cause the computer to further function as reception means. The reception means receives, from a user, an instruction for switching between the stereoscopically visible display and the planar view display. In this case, the switching means may switch the display of the display image performed by the display control means to the planar view display when the instruction for switching to the planar view display is received by the reception means.

In the features described above, a user is allowed to alleviate the user's own uncomfortableness caused by the game apparatus, by switching to the planar view display based on the user's determination.

In another exemplary configuration, the calculation means may calculate, as the rotation angle, a rotation angle about an axis of the gravity direction in the space in which the information processing apparatus exists.

In the features described above, it is possible to alleviate a user's uncomfortableness which is caused when a deviation occurs between the optimal point of view and a user's point of view for the stereoscopically visible display due to the information processing apparatus being rotated about an axis of the gravity direction.

In another exemplary configuration, the calculation means may calculate, as the rotation angle, a rotation angle about an axis of a direction normal to a plane formed by an axis of the gravity direction and an axis of the horizontal direction in the space in which the information processing apparatus exists.

In the features described above, it is possible to alleviate a user's uncomfortableness which is caused when a misalignment occurs between the optimal point of view and a user's point of view for the stereoscopically visible display due to the user rotating the information processing apparatus about an axis of almost a direction of a point of view of the user who is viewing a display screen.

Further, the present invention may be implemented as an information processing apparatus or an information processing system including each means described above, and as an information processing method including operations performed by each means described above.

As described above, according to the present invention, the computer-readable storage medium having stored therein the information processing program, the information processing method, the information processing apparatus, and the information processing system which are capable of alleviating a user's uncomfortableness. These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

External Structure of Game Apparatus

Figure 1:
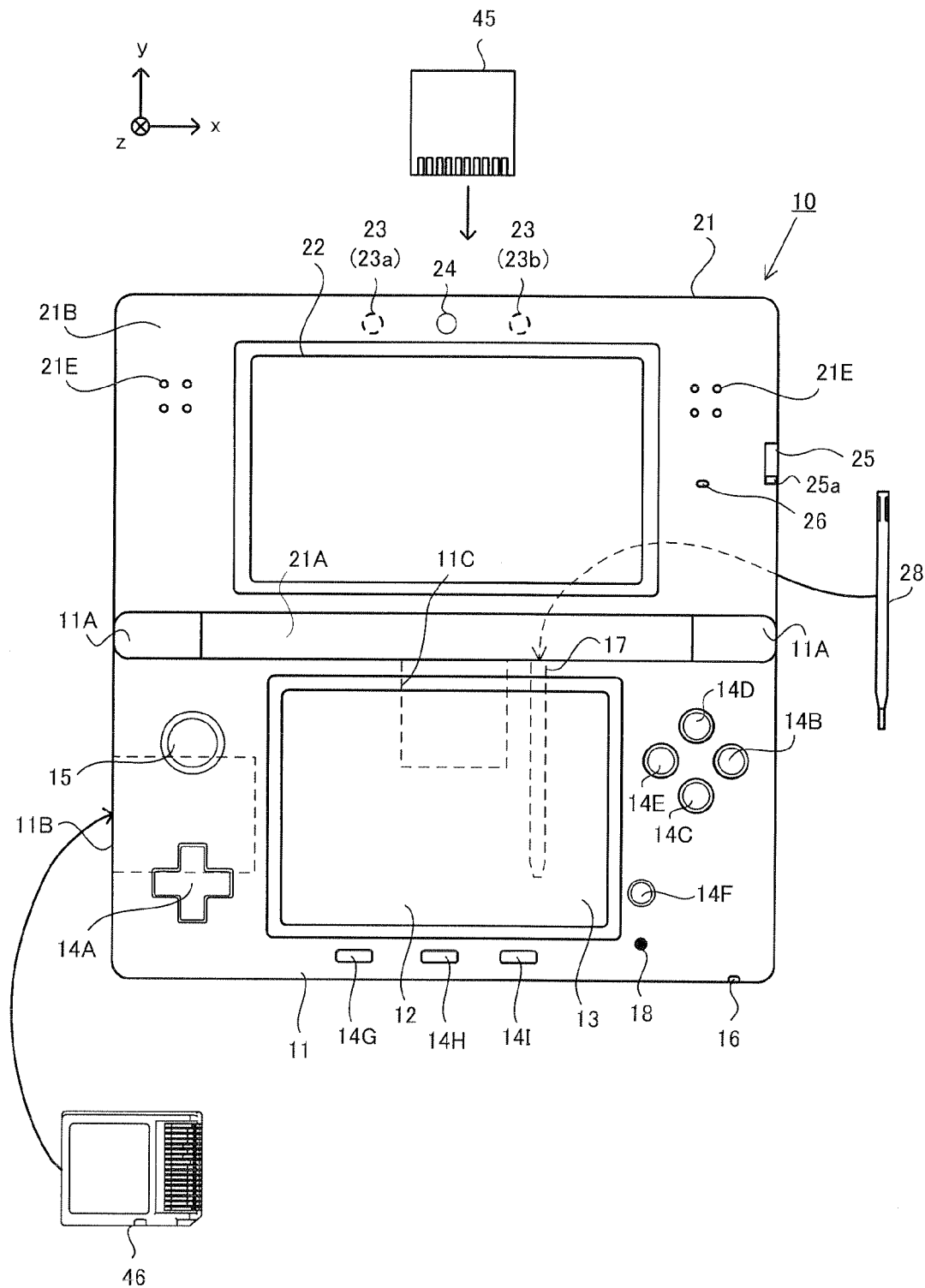
FIG. 1 is a diagram illustrating an exemplary external structure of a game apparatus according to embodiments of the present invention.

Hereinafter, a game apparatus according to an exemplary embodiment (first embodiment) of the present invention will be described. FIG. 1 is a plan view illustrating an appearance of a game apparatus 10. The game apparatus 10 is a hand-held game apparatus and is configured to be foldable. FIG. 1 is a front view of the game apparatus 10 in an opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1. The game apparatus 10 includes a lower housing 11 and an upper housing 21 as shown in FIG. 1. The lower housing 11 and the upper housing 21 are connected to each other so as to be openable and closable (foldable).

(Description of Lower Housing)

Initially, a structure of the lower housing 11 will be described. As shown in FIG. 1, in the lower housing 11, a lower LCD (Liquid Crystal Display) 12, a touch panel 13, operation buttons 14A to 14I, an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The number of pixels of the lower LCD 12 may be, for example, 320 dots×240 dots (the horizontal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14I are each an input device for making a predetermined input. As shown in FIG. 1, a cross button 14A (a direction input button 14A), a button 14B, a button 14C, a button 14D, a button 14E, a power button 14F, a selection button 14G, a HOME button 14H, and a start button 14I are provided on the inner side surface (main surface) of the lower housing 11. The cross button 14A is cross-shaped, and includes buttons for indicating an upward, a downward, a leftward, or a rightward direction. The buttons 14A to 14E, the selection button 14G, the HOME button 14H, and the start button 14I are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which slides parallel to the inner side surface of the lower housing 11. The analog stick 15 acts in accordance with a program executed by the game apparatus 10. For example, when a game in which a predetermined object emerges in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone (see FIG. 2) is provided as a sound input device described below, and the microphone detects for a sound from the outside of the game apparatus 10.

Moreover, the L button 14J and the R button 14K are provided on the upper side surface of the lower housing 11, which is not shown. The L button 14J and the R button 14K act as, for example, shutter buttons (imaging instruction buttons) of the imaging section. Further, a sound volume button 14L is provided on the left side surface of the lower housing 11, which is not shown. The sound volume button 14L is used for adjusting a sound volume of a speaker of the game apparatus 10.

As shown in FIG. 1, a cover section 11B is provided on the left side surface of the lower housing 11 so as to be openable and closable. Inside the cover section 11B, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 1, an insertion opening 11C through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11C. A predetermined game program is executed by connecting the external memory 44 to the game apparatus 10.

Further, as shown in FIG. 1, a first LED 16A for notifying a user of an ON/OFF state of a power supply of the game apparatus 10 is provided on the lower side surface of the lower housing 11. Furthermore, a second LED 16B for notifying a user of an establishment state of a wireless communication of the game apparatus 10 is provided on the right side surface of the lower housing 11, which is not shown. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (not shown).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1, in the upper housing 21, an upper LCD (Liquid. Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye may be alternately displayed in a time division manner may be used. Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (hereinafter, referred to as a "stereoscopically visible image) which is stereoscopically visible with naked eyes. That is, the upper LCD 22 allows a user to view the image for a left eye with her/his left eye, and the image for a right eye with her/his right eye by utilizing a parallax barrier, so that a stereoscopically visible image exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye). Thus, the upper LCD 22 is a display device capable of switching between a stereoscopically visible display (stereoscopic display mode) for displaying a stereoscopic image which is stereoscopically visible and a planar view display (planar display mode) for displaying an image in a planar manner (for displaying a planar view image). The switching of the display is performed by a process performed by a CPU 311 or by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D adjustment switch 25 is a slide switch, and is used for switching a display mode of the upper LCD 22 as described above. The 3D adjustment switch 25 is used for adjusting the stereoscopic effect of a stereoscopically visible image which is displayed on the upper LCD 22. However, as is apparent from the below description, an exemplary case will be described in which an image displayed on the upper LCD 22 is switched between the stereoscopically visible image and the planar view image, regardless of whether the 3D adjustment switch 25 is operated, in the present embodiment.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed in a state where the upper LCD 22 is in the stereoscopic display mode. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 43 described below.

(Internal Configuration of Game Apparatus 10)

Figure 2:
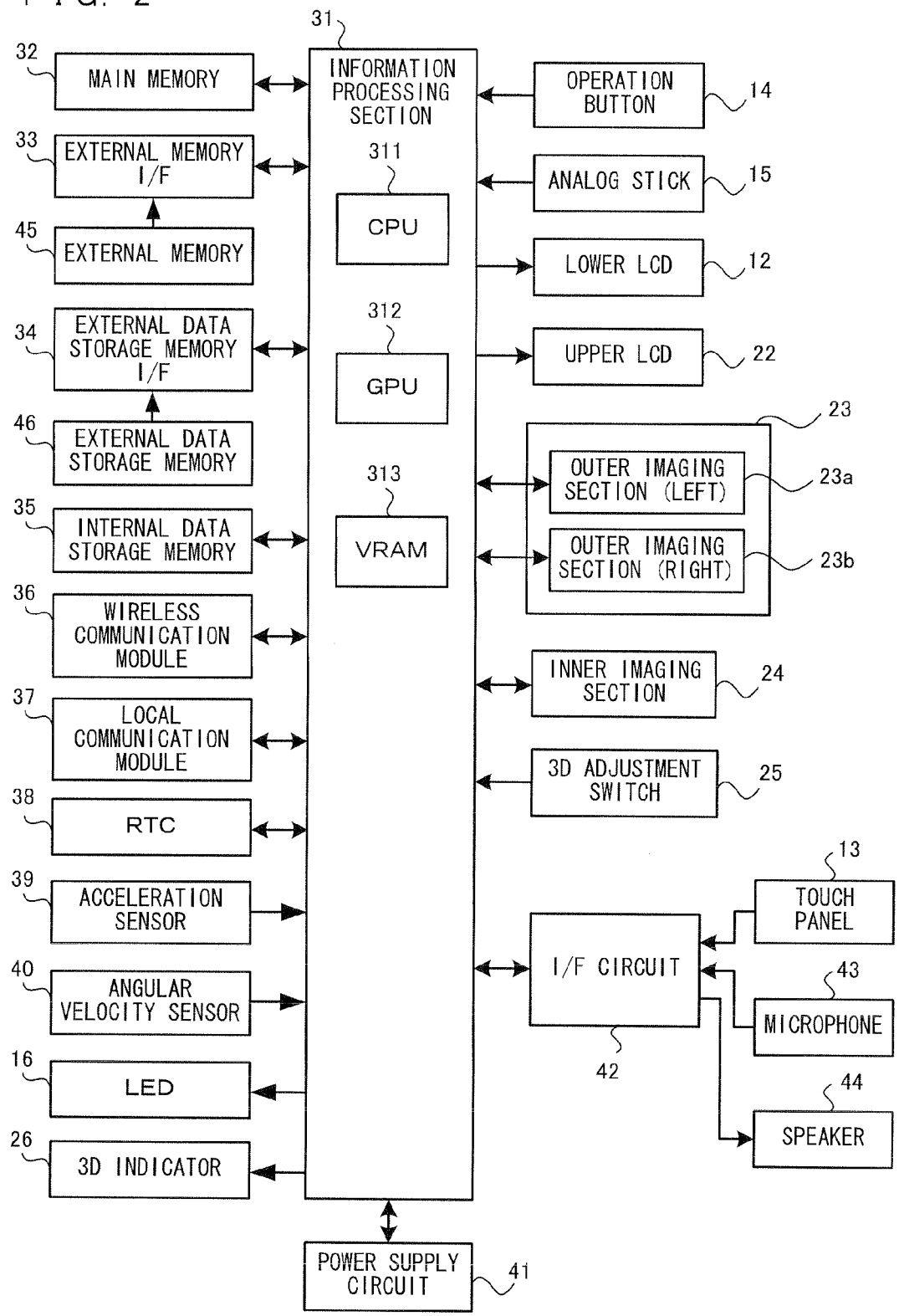
FIG. 2 is a diagram illustrating an exemplary internal structure of the game apparatus according to the embodiments of the present invention.

Next, an internal electrical configuration of the game apparatus 10 will be described with reference to FIG. 2. FIG. 2 is a block diagram illustrating an internal configuration of the game apparatus 10. As shown in FIG. 2, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, an angular velocity sensor 40 a power supply circuit 41, an interface circuit (I/F circuit) 42, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory connected to the external memory I/F 33, or the internal data storage memory 35) in the game apparatus 10, to execute a process based on the program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the process based on the program described above, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, a communication based on an independent protocol, or infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The RTC 38 and the power supply circuit 41 are connected to the information processing section 31. The RTC 38 counts time and outputs the counted time to the information processing section 31. The information processing section 31 calculates a current time (date) based on the time counted by the RTC 38.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10.

An angular velocity sensor 40 is connected to the information processing section 31. The angular velocity sensor 40 detects angular velocities generated around the three axes (in the present embodiment, xyz-axes) of the game apparatus 10, and outputs, to the information processing section 31, data (angular velocity data) representing the angular velocities having been detected. The angular velocity sensor 40 is provided inside the lower housing 11, for example. The information processing section 31 receives the angular velocity data outputted by the angular velocity sensor 40, and calculates an orientation and a motion of the game apparatus 10.

The power supply circuit 41 controls power to be supplied from a power supply (the rechargeable battery accommodated in the lower housing 11) of the game apparatus 10, and supplies power to each component of the game apparatus 10.

The I/F circuit 42 is connected to the information processing section 31. The microphone 43 and the speaker 44 are connected to the I/F circuit 42. Specifically, the speaker 44 is connected to the I/F circuit 42 through an amplifier which is not shown. The microphone 43 detects a voice from a user, and outputs a sound signal to the I/F circuit 42. The amplifier amplifies the sound signal outputted from the I/F circuit 42, and a sound is outputted from the speaker 44. The touch panel 13 is connected to the I/F circuit 42. The I/F circuit 42 includes a sound control circuit for controlling the microphone 43 and the speaker 44 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made.

The operation button 14 includes the operation buttons 14A to 14L described above, and is connected to the information processing section 31. Operation data representing an input state of each of the operation buttons 14A to 14L is outputted from the operation button 14 to the information processing section 31, and the input state indicates whether or not each of the operation buttons 14A to 14I has been pressed. The information processing section 31 acquires the operation data from the operation button 14 to perform a process in accordance with the input on each of the operation buttons 14A to 14L. The CPU 311 acquires the operation data from the operation button 14 every predetermined time.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 22 to display a stereoscopic image (stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye, which are stored in the VRAM 313 of the information processing section 31, are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. In the present embodiment, the parallax barrier is constantly set to be ON. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and data of the taken images are outputted to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. The game apparatus 10 has the internal configuration as described above.

[Outline of Information Processing]

Figure 3:
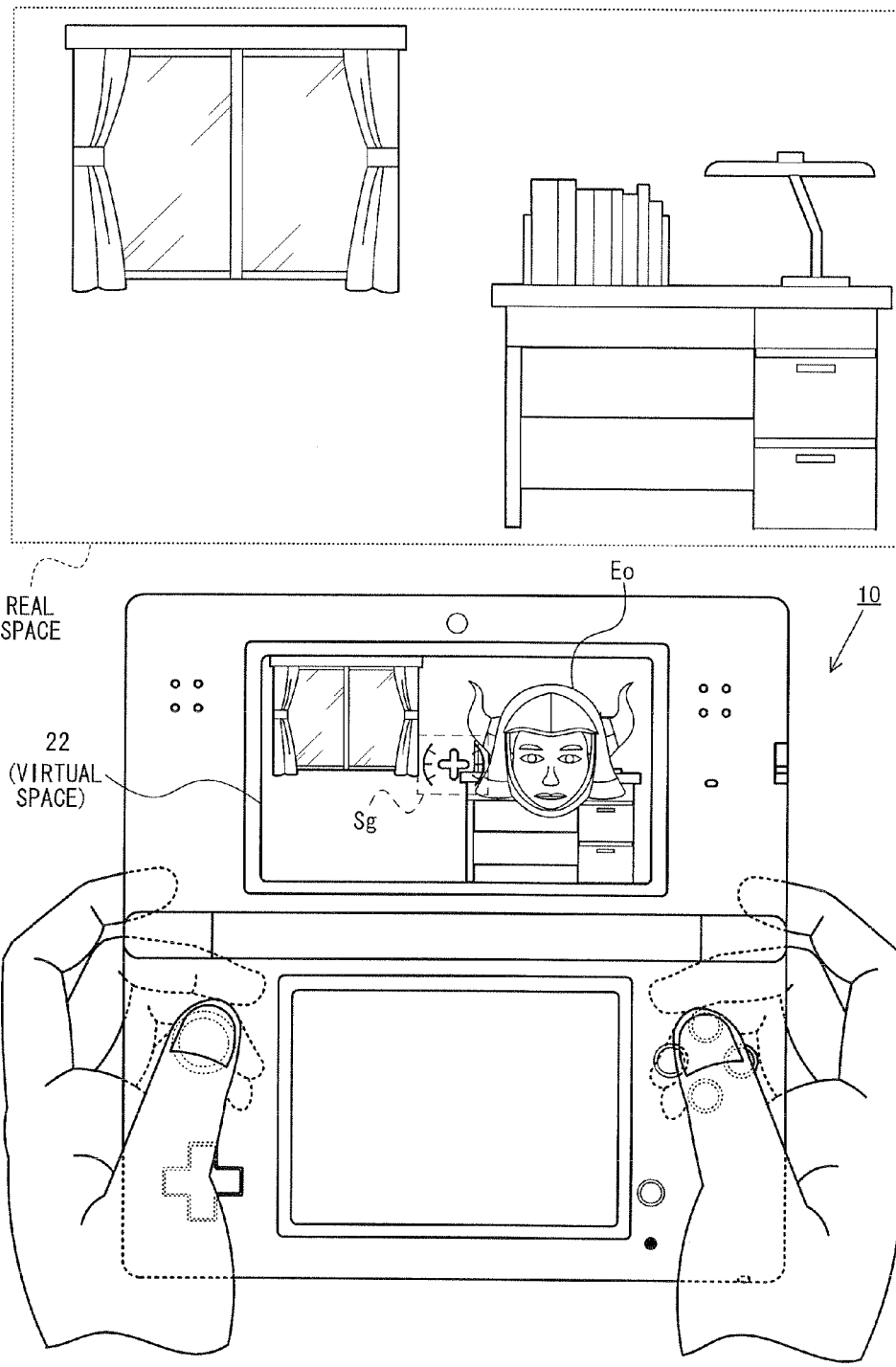
FIG. 3 is a diagram illustrating an exemplary usage of the game apparatus shown in FIG. 1.

Next, an outline of information processing according to the first embodiment will be described with reference to FIG. 3 to FIG. 7. In the first embodiment, a game process performed by the game apparatus 10 will be described as an example of the information processing. FIG. 3 is a diagram illustrating an exemplary usage of the game apparatus 10 shown in FIG. 1. FIG. 3 shows that an image obtained by combining an image which represents a real space and is taken by the outer imaging section 23, with an image representing a virtual space, is displayed on the upper LCD 22.

In the present embodiment, a game process for destroying a movable enemy object Eo appearing in the virtual space is performed by the game apparatus 10. In the game process according to the present embodiment, the movable enemy object Eo is aimed at, and, when hit by a bullet object, the enemy object Eo can be destroyed. The game process according to the present embodiment can be performed by a predetermined game program being executed by the game apparatus 10.

Figure 4:
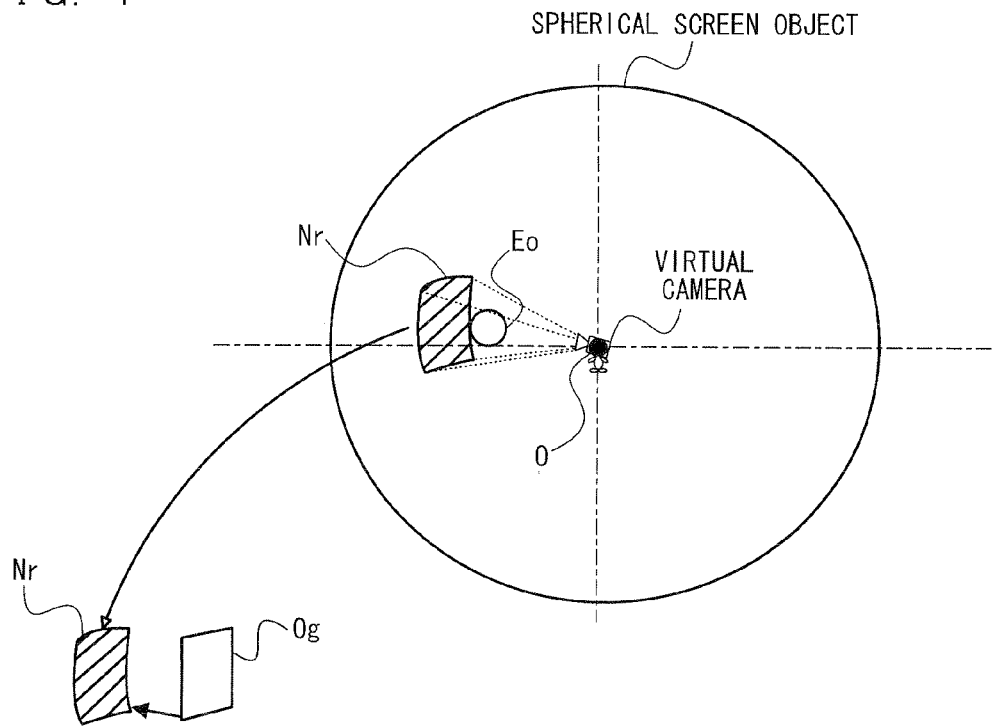
FIG. 4 is a diagram illustrating an exemplary virtual space according to the embodiments of the present invention.

Firstly, when the game process is performed by the game apparatus 10, a process of positioning a virtual camera in the virtual space is performed. More specifically, an image to be displayed on the upper LCD 22 is an image which is taken by using the virtual camera positioned in the virtual space, as shown in FIG. 4 by way of example. A position and an imaging direction of the virtual camera are determined by rotating the virtual camera about the originating point O of the virtual space in cooperation with the movement of the game apparatus 10 in the real space, thereby positioning the virtual camera. One of the position of the virtual camera or the imaging direction thereof may be changed, in some cases, depending on the movement of the game apparatus 10 in the real space. In the present embodiment, the movement of the game apparatus 10 in the real space is detected by using an angular velocity sensor 40. Therefore, the movement of the game apparatus 10 according to the present embodiment is detected as an angular velocity of a rotation about each of the x, y, and z axes of the game apparatus 10 shown in FIG. 1. When the imaging direction of the virtual camera is determined, rotation angles of the virtual camera relative to the x, y, and z axes of the virtual space are determined so as to correspond to angles calculated based on the angular velocities of the rotations about the axes, respectively, which have been detected by the angular velocity sensor 40.

Figure 5:
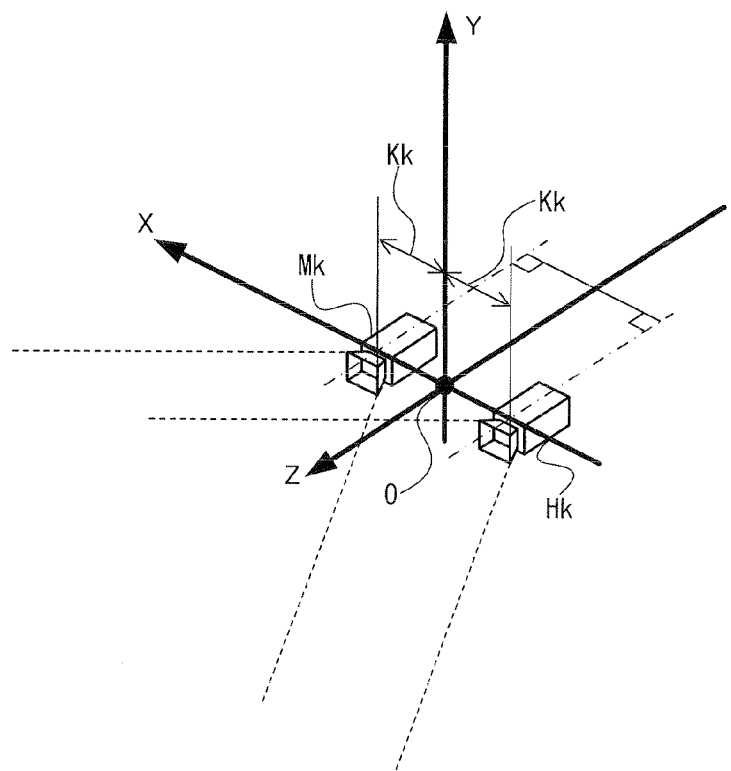
FIG. 5 is a diagram illustrating positioning of virtual cameras according to the embodiments of the present invention.

In the present embodiment, a unit of the angle relative to each axis which is calculated based on the angular velocity of the rotation about each axis having been detected by the angular velocity sensor 40 is preset so as to be equivalent to a unit of an angle relative to each axis of the virtual space. Therefore, in the present embodiment, the rotation angle relative to each axis calculated based on the angular velocity of the rotation about each axis detected by the angular velocity sensor 40 can be used, as it is, as a rotation angle for setting the imaging direction of the virtual camera. Further, as is apparent from the below description, in the present embodiment, when the game apparatus 10 is powered on, and an initialization process is performed, the imaging direction of the virtual camera is set to a predetermined initial direction. When the imaging direction of the virtual camera is set to the initial direction, the rotation angle of the virtual camera relative to each of the x, y, and z axes of the virtual space is initialized to zero. In the present embodiment, the initial direction of the virtual camera is defined as a z-axial positive direction as shown in FIG. 5 by way of example.

Further, when the game process is performed, a process for causing the enemy object Eo to appear or move is performed in an enemy object process. The enemy object Eo of the present embodiment will be described. In the present embodiment, an image representing a face of a person is used for the enemy object Eo, as shown in FIG. 3 by way of example. Images representing faces of persons are taken by the outer imaging section 23, and are collected, and one or some of the images representing the faces of the persons can be used for the enemy object Eo. Further, for example, when a game is executed in which taken images of faces are used, and the executed game has successfully resolved, the images representing the faces may be collected so as to be stored in a non-volatile memory such as the internal data storage memory 33. Furthermore, the images representing the faces may be acquired and collected in any method by, for example, downloading the images through the wireless communication module 36 or the local communication module 37.

The enemy object Eo of the present embodiment is determined by a user. When the enemy object Eo is determined, a user selects any of images representing faces having been collected as described above. The image of the face having been selected by user is used as an image to be texture-mapped to a predetermined object. Further, an object to which the image of the face has been texture-mapped is capped with a headwear object having a predetermined shape. The headwear object is selected, by a user, from among objects each having a predetermined shape, based on a rank such as a boss character or a normal character. Thus, the enemy object Eo is determined by capping, with the headwear object, an object to which the image of the face selected by the user has been texture-mapped. One or more kind of the enemy object Eo is determined. In the present embodiment, the process for collecting images of faces and the process for determining the enemy object Eo as described above are performed separately from the game process, and the detailed description thereof is not given.

In the enemy object process, one or more kind of the enemy object Eo having been thus determined is caused to appear or move in the virtual space in accordance with a predetermined algorithm (hereinafter, referred to as an "enemy control algorithm). More specifically, in the present embodiment, a spherical screen object is positioned in the virtual space so as to have the originating point O at the center of the virtual space, as shown in FIG. 4 by way of example. In the enemy object process, a process of causing the enemy object Eo to appear inside the screen object, outside the screen object, or on the boundary of the screen object, in accordance with the enemy control algorithm, is performed. Further, in the enemy object process, the position and the orientation of the enemy object Eo are determined such that the enemy object Eo is moved inside the screen object, outside the screen object, or on the boundary of the screen object, in accordance with the enemy control algorithm.

Further, when the game process is performed, a bullet object process of shooting or moving the bullet object representing a bullet which can destroy the enemy object Eo, in accordance with a predetermined algorithm (hereinafter, referred to as a "bullet control algorithm"), is performed. In the bullet object process, when it is determined that an operation of shooting a bullet has been performed, based on operation data outputted form the operation button 14, a process of causing the bullet object to appear at a predetermined appearance position in the virtual space is performed. Further, in the bullet object process, a process of moving the bullet object having been already shot, at a predetermined speed, in a predetermined direction, is performed. In the bullet object process, for example, when it is determined that the bullet object has hit any one of the enemy objects Eo, a process of performing a display so as to destroy and extinguish the enemy object Eo having been hit is performed.

When the game process is performed, a process for texture-mapping an image-taken-by-outer-imaging-section Og to the screen object, is performed. In the present embodiment, an image taken by the outer imaging section (left) 23a is used as the image-taken-by-outer-imaging-section Og. When the image-taken-by-outer-imaging-section Og is captured by the outer imaging section (left) 23a, an inside region Nr (see FIG. 4) of the screen object in the imaging range is determined based on the imaging direction of the virtual camera having been set as described above. When the region Nr of the screen object in the imaging range is determined, the image-taken-by-outer-imaging-section Og is texture-mapped to the region Nr.

In the present embodiment, each of the process of positioning the virtual camera, and the process of texture-mapping the image-taken-by-outer-imaging-section Og to the screen object in the imaging range is repeatedly performed in real time at predetermined process unit time intervals. In the present embodiment, the process unit time represents one process loop as shown in, for example, the flow charts of FIG. 10 and FIG. 11. Further, the process of causing the enemy object Eo and the bullet object to appear and move, as necessary, in the virtual space including the screen object to which the image-taken-by-outer-imaging-section Og has been texture-mapped, as described above, is repeatedly performed in real time at the predetermined process unit time intervals. Therefore, the virtual space including the enemy object Eo is displayed on the upper LCD 22 as if the enemy object Eo appears and moves in the real space represented by the image-taken-by-outer-imaging-section Og.

Further, positioning of the virtual camera is performed in real time at the predetermined process unit time intervals, in cooperation with the movement of the game apparatus 10 in the real space as described above. An aiming image Sg is superimposed and displayed at the center of the upper LCD 22 as shown in FIG. 3 by way of example. Therefore, the following game can be provided to a user by executing the game process. That is, the game apparatus 10 is moved for aiming at the enemy object Eo which is displayed so as to exist in the real space, and, when a user presses a predetermined operation button, a bullet is shot so as to destroy the enemy object Eo.

Next, an image displayed on the upper LCD 22 will be described in detail. In the present embodiment, as described below, a stereoscopically visible image as described above is displayed on the upper LCD 22 unless the game apparatus 10 is greatly moved. In the present embodiment, the stereoscopically visible image is generated by using two virtual cameras which are positioned in the virtual space and which have the imaging directions set as described above. The two virtual cameras positioned in the virtual space are used for generating an image for a left eye and an image for a right eye, as described above. One of the two virtual cameras positioned in the virtual space is used as a left virtual camera for generating the image for a left eye, and the other of the two virtual cameras positioned in the virtual space is used as a right virtual camera for generating the image for a right eye.

FIG. 5 is a diagram illustrating an exemplary virtual camera positioned in the virtual space according to the present embodiment. In the present embodiment, a left virtual camera Hk and a right virtual camera Mk are moved in the negative direction and the positive direction, respectively, of the x axis from the originating point O of the virtual space, such that each of the left virtual camera Hk and the right virtual camera Mk is spaced from the originating point O by a distance Kk (hereinafter, referred to as a "virtual camera distance Kk") as shown in FIG. 5 by way of example. Therefore, the distance between the left virtual camera Hk and the right virtual camera Mk is twice the virtual camera distance Kk. Moreover, the imaging direction of the left virtual camera Hk and the imaging direction of the right virtual camera Mk are parallel to each other. As described above, the left virtual camera Hk and the right virtual camera Mk which are spaced from each other by the distance 2Kk and which have imaging directions parallel to each other are rotated about the originating point O of the virtual space in cooperation with the movement of the game apparatus 10 as described above, thereby positioning the left virtual camera Hk and the right virtual camera Mk. An image of the virtual space which is taken by the left virtual camera Hk is generated as the image for a left eye, and an image of the virtual space which is taken by the right virtual camera Mk is generated as the image for a right eye. The distance between the left virtual camera Hk and the right virtual camera Mk is 2Kk. Therefore, the image for the left eye and the image for the right eye are generated as images having a parallax corresponding to the distance 2Kk. Accordingly, the image for the left eye and the image for the right eye are displayed on the upper LCD 22 as a stereoscopically visible image having the parallax therebetween.

Figure 6:
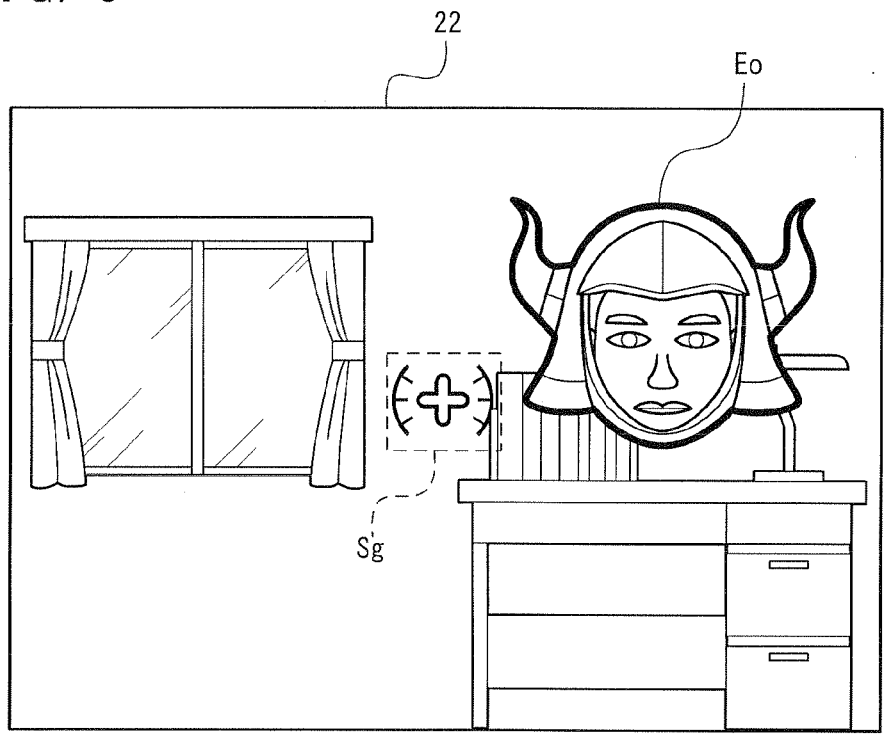
FIG. 6 is a diagram illustrating an exemplary display screen of the game apparatus according to the embodiments of the present invention.

FIG. 6 shows an exemplary display on the upper LCD 22 which represents the stereoscopically visible image of the virtual space. The stereoscopically visible image is viewed by a user as a stereoscopic image which does not blur as viewed from an optimal point of view in the real space which corresponds to the point of view of the virtual camera in the virtual space. Specifically, when the game apparatus 10 is positioned by a user so as to obtain agreement between the optimal points of view and the points of view of both of the user's eyes such that a point of view of a user's right eye in the real space corresponds to the point of view of the right virtual camera Mk in the virtual space, and a point of view of a user's left eye in the real space corresponds to the point of view of the left virtual camera Hk in the virtual space, the stereoscopically visible image can be viewed as a stereoscopic image which does not blur. FIG. 6 is a diagram illustrating an exemplary display on the upper LCD 22 as viewed from the optimal point of view.

Figure 7:
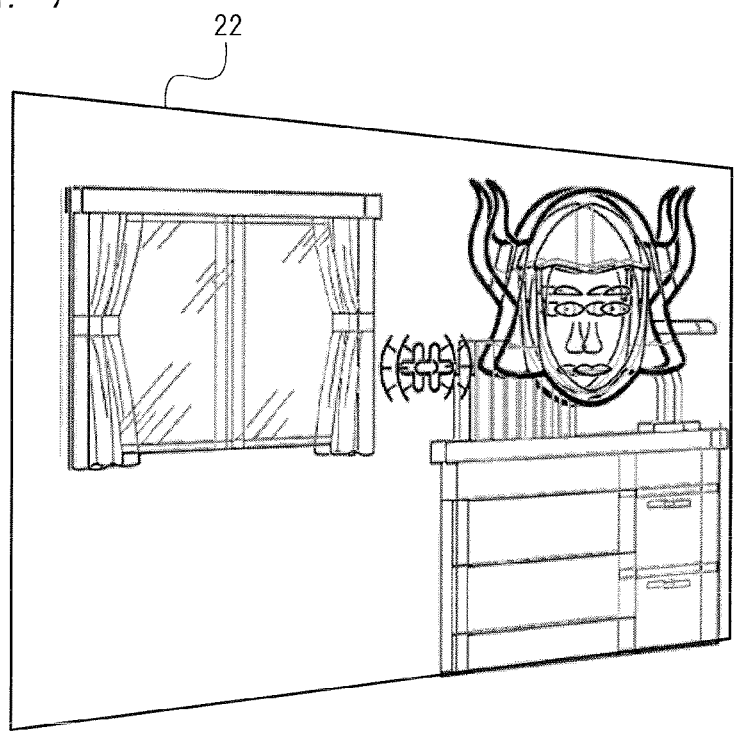
FIG. 7 is a diagram illustrating an exemplary display screen of the game apparatus according to the embodiments of the present invention.

On the other hand, when the upper LCD 22 on which the stereoscopically visible image is displayed is viewed from a point of view different from the optimal point of view described above, an image for a left eye and an image for a right eye, which are different images, and form a parallax therebetween, are viewed as a doubly blurring image by the user, as shown in FIG. 7 by way of example. FIG. 7 is a diagram illustrating a screen display which is displayed on the upper LCD 22 when the game apparatus 10 positioned so as to conform a user's point of view to the optimal point of view has been rotated about the y-axis shown in FIG. 1 counterclockwise by a predetermined angle. As shown in FIG. 7 by way of example, when the user's point of view is deviated from the optimal point of view, the stereoscopically visible image is viewed by a user as a planar blurring image which does not exert a stereoscopic effect, so that the user feels uncomfortable. In particular, in the game process described above, a user is likely to reflexively move the game apparatus 10 greatly such that the aiming image Sg is displayed on the enemy object Eo which is displayed so as to move in the real space. Therefore, when such a game process is performed by the game apparatus 10, a deviation is likely to occur between a user's point of view and the optimal point of view described above, so that a probability that a user feels uncomfortable may be increased.

In the present embodiment, when the game apparatus 10 has been greatly moved, the user's point of view is determined as having been deviated from the optimal point of view described above, an image displayed on the upper LCD 22 is switched from the stereoscopically visible image to the planar view image described above. More specifically, when the game apparatus 10 has been greatly moved, the virtual camera distance Kk is calculated and set based on the displacement. In the present embodiment, when the virtual camera distance Kk is calculated based on the displacement of the game apparatus 10, the virtual camera distance Kk is calculated so as to be less than an upper limit value Jt described below. When the virtual camera distance Kk is calculated and set so as to be less than the upper limit value Jt, a parallax between the image for a left eye and the image for a right eye is reduced. Therefore, the difference between the image for a left eye and the image for a right eye is reduced, and the user's uncomfortableness caused by a deviation between the user's point of view and the optimal point of view as described above is reduced. In particular, when the virtual camera distance Kk calculated based on the displacement of the game apparatus 10 indicates zero, the image for a left eye and the image for a right eye represent the same image, thereby eliminating the user's uncomfortableness as described above.

Specifically, when the game process is performed, whether any one of the angular velocities of rotations about the x, y, and z-axes (see FIG. 1) detected by the angular velocity sensor 40 is greater than or equal to a predetermined angular velocity threshold value, is determined. When any one of the angular velocities of the rotations about the x, y, and z axes is greater than or equal to the predetermined angular velocity threshold value, the game apparatus 10 is determined as having been greatly moved, and the virtual camera distance Kk based on the angular velocity which is greater than or equal to the predetermined angular velocity threshold value is calculated. In the present embodiment, a relationship between an angular velocity and the virtual camera distance Kk, which is to be used for switching from the stereoscopically visible image to the planar view image, is preset. Further, the relationship between the angular velocity and the virtual camera distance Kk, which is to be used for switching from the stereoscopically visible image to the planar view image, may be any relationship in which the virtual camera distance Kk can be calculated within a range of the magnitudes of the angular velocity, in the present embodiment. An exemplary relationship between the angular velocity and the virtual camera distance Kk may be the following relationship. That is, the angular velocity and the virtual camera distance Kk may be proportional to each other such that the virtual camera distance Kk of the upper limit value Jt is calculated for the angular velocity equivalent to the angular velocity threshold value, and the virtual camera distance Kk is calculated as zero for an angular velocity which is greater than the angular velocity equivalent to the angular velocity threshold value, by a predetermined amount.

As is apparent from FIG. 5, the point of view of the left virtual camera Hk and the point of view of the right virtual camera Mk approach each other by reducing the virtual camera distance Kk. Therefore, the image for a left eye and the image for a right eye are generated as an image including a reduced parallax therebetween, and the difference between the images are reduced, so that the image for the left eye and the image for the right eye are displayed, on the upper LCD 22, as the planar view image rather than the stereoscopically visible image.

Further, in the present embodiment, when the user's point of view is determined as having returned to the optimal point of view described above after an image displayed on the upper LCD 22 has been switched from the stereoscopically visible image to the planar view image, the planar view image is switched so as to be returned to the stereoscopically visible image. Thus, when the user's point of view has been returned to the optimal point of view, the stereoscopically visible image which can provide a stereoscopic effect can be displayed for the user again.

Specifically, in the game process described above, when each of the angular velocities detected by the angular velocity sensor 40 is less than the angular velocity threshold value as described above, the user's point of view is determined as having returned to the optimal point of view described above. This is because, when each of the angular velocities detected by the angular velocity sensor 40 is less than the angular velocity threshold value, it can be determined that the user's point of view is fixed as the optimal point of view, and the game apparatus 10 is stationary relative to the user.

In the present embodiment, the planar view image is gradually switched to the stereoscopically visible image, instead of the planar view image being immediately switched to the stereoscopically visible image. Specifically, a point of time when the user's point of view is determined as having returned to the optimal point of view is set as a start time, and the virtual camera distance Kk for each of the left virtual camera Hk and the right virtual camera Mk is changed in accordance with the following equation.

$$Kk=(-0.5\times t^3)+(1.5\times t)\times Jt \quad (1)$$

In equation (1), t represents an elapsed time (hereinafter, referred to as a switching time t) from the start time. In equation (1), Jt represents a predetermined upper limit value of the virtual camera distance Kk. As is apparent from equation (1), in the present embodiment, when the switching time t indicates the predetermined upper limit time, the virtual camera distance Kk indicating the upper limit value Jt is calculated. The upper limit value Jt of the virtual camera distance Kk is preset as a distance which enables the stereoscopically visible image to be viewed with the maximal stereoscopic effect when the user's point of view corresponds to the optimal point of view. Further, in the present embodiment, the upper limit time of the switching time t is preset as one second.

In the present embodiment, when the stereoscopically visible image is switched to the planar view image, the virtual camera distance Kk is calculated and set in accordance with the angular velocity, as described above. In the present embodiment, an initial value of the switching time t is set to a switching start time St such that, regardless of a value of the virtual camera distance Kk calculated based on the angular velocity, the virtual camera distance Kk indicates the upper limit value Jt when the switching time t reaches the upper limit time. Specifically, the switching time t which is to be substituted into equation (1) for determining the virtual camera distance Kk which has been calculated when the stereoscopically visible image is switched to the planar view image, is calculated, and the switching start time St can be determined and set based on the switching time t having been obtained.

When the switching from the planar view image to the stereoscopically visible image is started, the switching start time St has been determined, and counting of the switching time t from the switching start time St to the upper limit time is started. Until the switching time t reaches the upper limit time, the virtual camera distance Kk is sequentially calculated and determined by using equation (1) so as to reach the upper limit value Jt. Thus, the planar view image can be gradually switched to the stereoscopically visible image. When the planar view image is immediately switched to the stereoscopically visible image, the stereoscopically visible image blurs due to adjustment of focus of user's eyes being delayed. However, in the process described above, a state where an image which blurs and provides no stereoscopic effect is viewed can be prevented. In the game process in which the enemy object Eo is displayed on the upper LCD 22 as if the enemy object Eo is moving in the real space, it is possible to prevent a state where the moving object cannot be viewed.

[Data to be Stored in Main Memory]

Next, data to be stored in the main memory 32 and the VRAM 313 in accordance with the game program being executed by the CPU 311 will be described with reference to FIG. 8 and FIG. 9 prior to description of a specific operation performed by the CPU 311 of the game apparatus 10.

Figure 8:
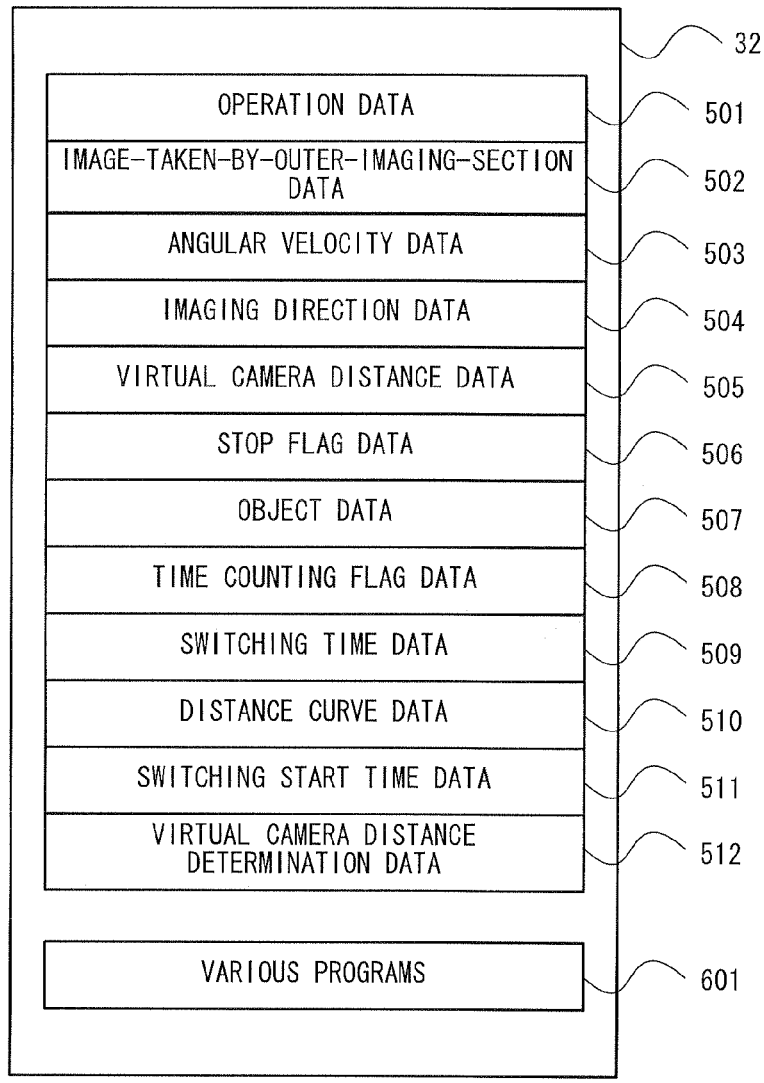
FIG. 8 is a diagram illustrating an exemplary memory map according to a first embodiment of the present invention.
Figure 9:
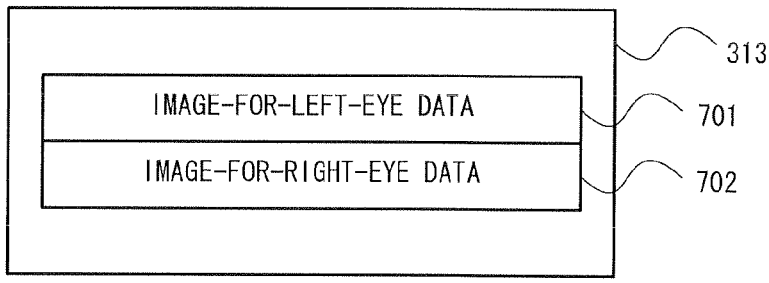
FIG. 9 is a diagram illustrating an exemplary memory map according to the first embodiment of the present invention.

As shown in FIG. 8 by way of example, operation data 501, image-taken-by-outer-imaging-section data 502, angular velocity data 503, imaging direction data 504, virtual camera distance data 505, stop flag data 506, object data 507, time counting flag data 508, switching time data 509, distance curve data 510, switching start time data 511, virtual camera distance determination data 512, and various programs 601 are stored in the main memory 32.

The operation data 501 is acquired from the operation button 14 and stored by the CPU 311, every predetermined time period as described above (for example, at the process unit time intervals as describe above).

The image-taken-by-outer-imaging-section data 502 represents the image-taken-by-outer-imaging-section Og which has been captured by the outer imaging section 23a at the process unit time intervals described above.

The angular velocity data 503 represents a rotation angular velocity of a rotation about each of the x, y, and z axes, and the rotation angular velocity is acquired from the angular velocity sensor 40 at the process unit time intervals described above. The angular velocity data 503 is acquired from the angular velocity sensor 40 and stored in the main memory 32 at the process unit time intervals. In the present embodiment, the angular velocity sensor 40 detects a positive and a negative angular velocities. The positive angular velocity represents an angular velocity of clockwise rotation about each of the x, y, and z axes, and the negative angular velocity represents an angular velocity of counterclockwise rotation about each of the x, y, and z axes. Therefore, the direction of rotation is indicated by the angular velocity of the rotation about each axis which is represented by the angular velocity data 503, by using the positive or the negative sign.

The imaging direction data 504 represents an imaging direction of the virtual camera which is calculated by the CPU 311 based on each angular velocity represented by the angular velocity data 503. Specifically, the imaging direction data 504 represents a rotation angle relative to each of the x, y, and z axes for each of the left virtual camera Hk and the right virtual camera Mk in the virtual space having the originating point O at the center of the virtual space. Each rotation angle represented by the imaging direction data 504 is initialized to zero in the initialization process described below such that the left virtual camera Hk and the right virtual camera Mk are each oriented in the initial direction described above. The angular velocities of the rotations about the axes which are represented by the angular velocity data 503 are added to the rotation angles, respectively, represented by the imaging direction data 504, by the CPU 311, at the process unit time intervals, after the game apparatus 10 is powered on. For each angular velocity detected by the angular velocity sensor 40, as is apparent form the above description, the angular velocity of the clockwise rotation is assigned a positive sign, whereas the angular velocity of the counterclockwise rotation is assigned a negative sign. Therefore, the rotation angles represented by the imaging direction data 504 each indicate zero when the game apparatus 10 is powered on, and are calculated in real time so as to indicate the rotation angles relative to the axes, respectively, of the game apparatus 10. When the left virtual camera Hk and the right virtual camera Mk are positioned based on the imaging direction data 504, each of the left virtual camera Hk and the right virtual camera Mk is rotated, relative to the x, y, and z axes in the virtual space, about the originating point O of the virtual space, by the rotation angles represented by the imaging direction data 504. Thus, the imaging directions of the left virtual camera Hk and the right virtual camera Mk can be calculated and determined in cooperation with the movement of the game apparatus 10 as described above.

The virtual camera distance data 505 represents the virtual camera distance Kk for each of the left virtual camera Hk and the right virtual camera Mk.

The stop flag data 506 represents a result of the determination of the CPU 311 as to whether a user's point of view is an optimal point of view as described above. The stop flag data 506 represents "on" when the user's point of view is the optimal point of view as described above. On the other hand, the stop flag data 506 represents "off" when the user's point of view is not the optimal point of view.

The object data 507 represents data for the enemy object Eo and the bullet object as described above. More specifically, the object data 507 represents a shape, a position, and an orientation of one or more kind of the enemy object Eo which has been set by a user as described above, and, in the object data 507, the shape, the position, and the orientation are associated with each other. Further, the object data 507 represents a shape, a position, and an orientation of the bullet object as described above, and, in the object data 507, the shape, the position, and the orientation are associated with each other.

Before the game process is performed, data representing the shape, the position, and the orientation of the enemy object Eo which are represented by the object data 507 are stored in the main memory 32 so as to be associated with each other, in accordance with execution of a program for causing the CPU 311 to perform a process for determining the enemy object Eo, independently of the game process described above. At this time, the position and the orientation of the enemy object Eo are initialized to zero. The orientation of the enemy object Eo represented by the object data 507 is represented by a rotation angle relative to each of the x, y, and z axes in the virtual space. Further, the shape of the bullet object represented by the object data 507 is a predetermined shape. The shape of the bullet object represented by the object data 507 is read and stored in the main memory 32 when the game program is read, as described below. At this time, the position and the orientation of the bullet object are initialized to zero, and the bullet object is formed so as to have the shape having been read. The orientation of the bullet object represented by the object data 507 is represented by a rotation angle relative to each of the x, y, and z axes in the virtual space. Further, in some cases, a plurality of the bullet objects having the same shape are located in the virtual space in accordance with a user performing shooting operation. In this case, the predetermined shape of the bullet object is repeatedly copied such that the number of times the predetermined shape is copied is equal to the number of bullet objects in the virtual space. The object data 507 is updated to data in which the copied shapes are each associated with the position and the orientation.

The time counting flag data 508 indicates whether the switching time t described above is being counted. The time counting flag data 508 represents "on" when the switching time t is being counted. On the other hand, the time counting flag data 508 represents "off" when the switching time t is not being counted.

The switching time data 509 represents the switching time t.

The distance curve data 510 represents the virtual camera distance Kk for each of the left virtual camera Hk and the right virtual camera Mk so as to be associated with the switching time t when the planar view image is switched to the stereoscopically visible image as described above. Specifically, in the present embodiment, the distance curve data 510 is represented as data calculated by using equation (1). The distance curve data 510 is read when the game program is read from the internal data storage memory 35 as described below.

The switching start time data 511 represents the switching start time St having been determined as described above.

The virtual camera distance determination data 512 represents a relationship between the angular velocity and the virtual camera distance Kk which is used when the stereoscopically visible image is switched to the planar view image. The virtual camera distance determination data 512 is read when the game program is read from the internal data storage memory 35 as described below.

Various programs 601 are programs to be executed by the CPU 311. For example, the game program and the like as described above are stored as various program 601 in the main memory 32. Further, the enemy control algorithm and the bullet control algorithm as described above are contained in the game program stored in the main memory 32.

[Data Stored in VRAM]

Next, data stored in the VRAM 313 will be described. FIG. 9 is a diagram illustrating an example of data to be stored in the VRAM 313. The image-for-left-eye data 701 and the image-for-right-eye data 702 are stored in the VRAM 313. The image-for-left-eye data 701 and the image-for-right-eye data 702 represent an image generated by the CPU 311 issuing an instruction to the GPU 312, and are rendered and stored in the VRAM 313. Specifically, the image-for-left-eye data 701 represents an image for a left eye described above. The image-for-right-eye data 702 represents an image for a right eye described above.

[Game Process]

Figure 10:
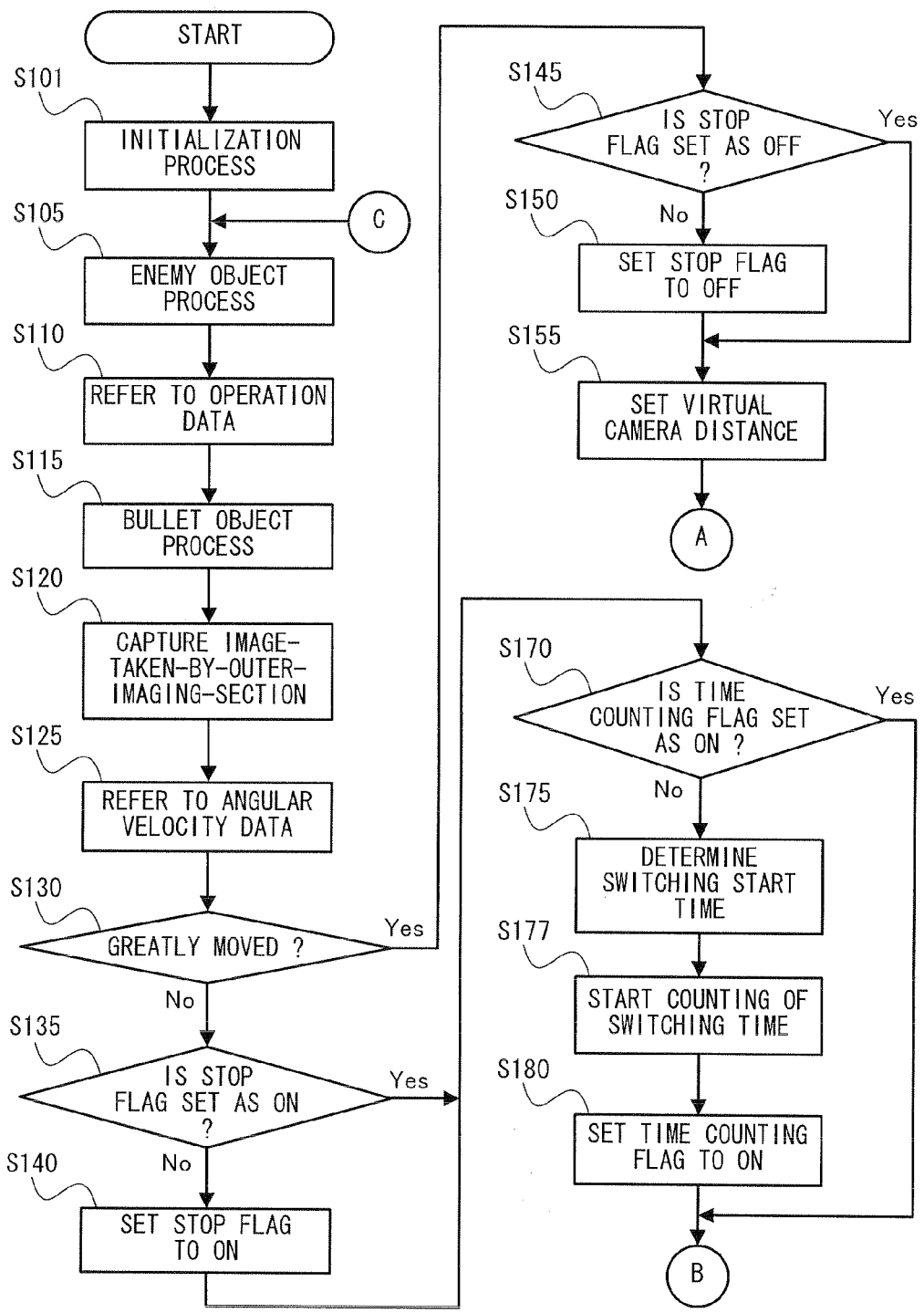
FIG. 10 is a diagram illustrating an exemplary flow chart of a display control process performed by a CPU of the game apparatus executing an information processing program according to the first embodiment of the present invention.
Figure 11:
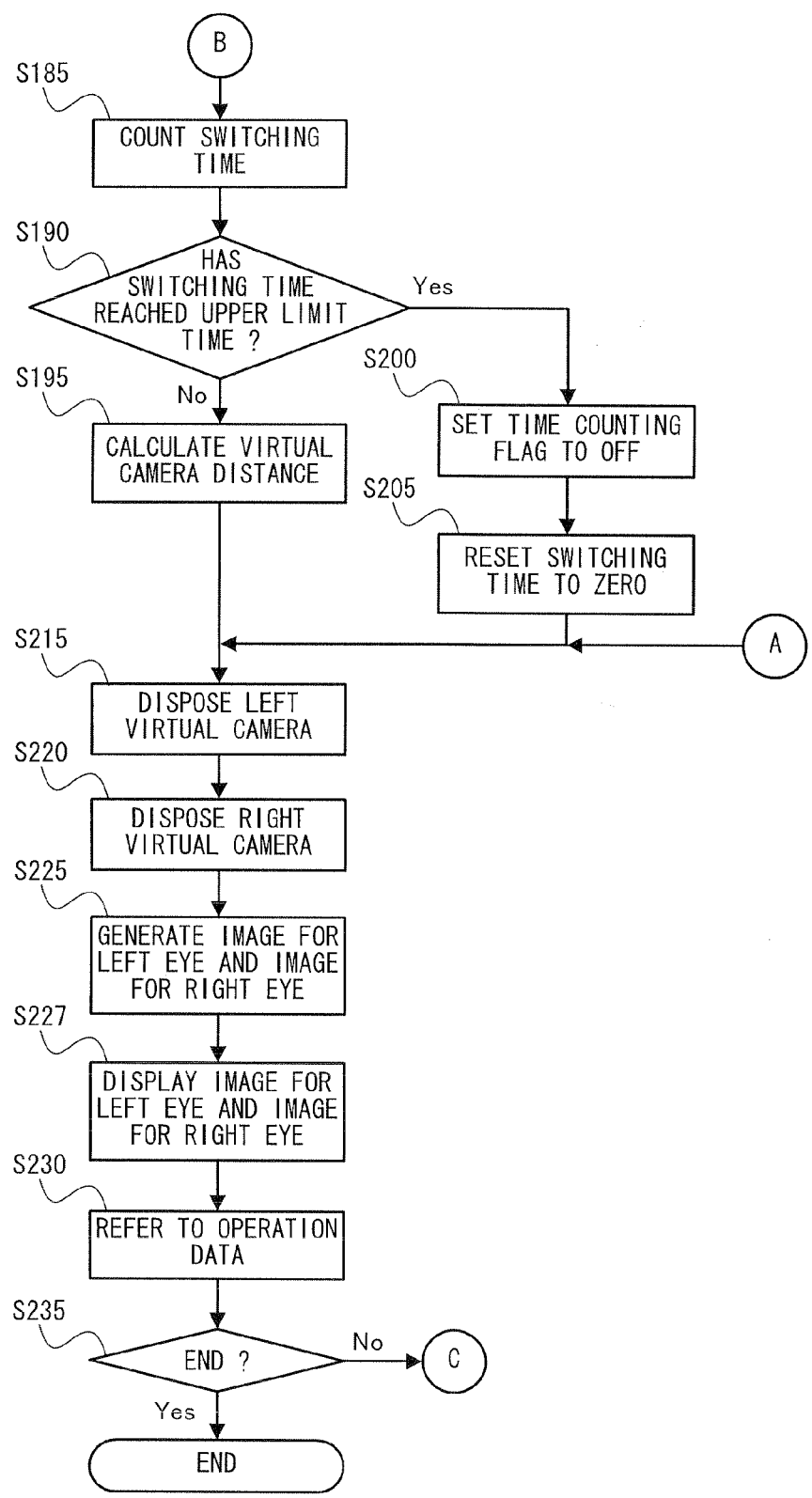
FIG. 11 is a diagram illustrating an exemplary flow chart of the display control process performed by the CPU of the game apparatus executing the information processing program according to the first embodiment of the present invention.

Next, a specific operation performed by the CPU 311 of the game apparatus 10 according to the present embodiment will be described. Firstly, when the game apparatus 10 is powered on, a boot program (not shown) is executed by the CPU 311. Thus, the game program stored in the internal data storage memory 35 is loaded and stored in the main memory 32. The game program stored in the main memory 32 is executed by the CPU 311, thereby performing the process shown in flow charts of FIG. 10 and FIG. 11. FIG. 10 and FIG. 11 are flow charts showing an example of the game process performed by the CPU 311 executing the game program. In FIG. 10 and FIG. 11, step is abbreviated as "S".

When the game process is started, the CPU 311 firstly performs initialization process (step 101). Specifically, the CPU 311 sets various flag data stored in the main memory 32 so as to represent off. Further, the CPU 311 clears an image represented by the image-taken-by-outer-imaging-section data 502. Moreover, the CPU 311 sets, to zero, values represented by the angular velocity data 503, the imaging direction data 504, the switching time data 509, and the switching start time data 511. The CPU 311 sets the virtual camera distance Kk represented by the virtual camera distance data 505 so as to represent the upper limit value Jt. The CPU 311 erases all the image data stored in the VRAM 313. The CPU 311 reads, from the internal data storage memory 35, the distance curve data 510 and the virtual camera distance determination data 512, and stores the distance curve data 510 and the virtual camera distance determination data 512 in the main memory 32.

In the initialization process, the CPU 311 sets the virtual camera distance Kk represented by the virtual camera distance data 505 so as to represent the upper limit value Jt. Therefore, the stereoscopically visible image is displayed on the upper LCD immediately after the game process is started. Further, in the initialization process, the CPU 311 sets, to zero, a value represented by the imaging direction data 504. Thus, the rotation angle represented by the imaging direction data 504 can be calculated as zero when the game apparatus 10 is powered on as described above.

When the initialization process has been completed, the CPU 311 performs the enemy object process as described above (step 105). Specifically, the CPU 311 determines, based on the enemy control algorithm, whether the enemy object Eo which is to appear in the virtual space is included in one or more kind of the enemy object Eo represented by the object data 507. When the enemy object Eo which is to appear is included, the CPU 311 updates the position which is associated with the enemy object Eo in the object data 507 so as to represent an appearance position, and updates an orientation associated with the enemy object Eo so as to represent a predetermined initial orientation. Further, in the enemy object process, the CPU 311 determines, based on the enemy control algorithm, a position and an orientation used for moving the enemy object Eo having already appeared, and updates the position and the orientation which are associated with the enemy object Eo in the object data 507 so as to represent the position having been determined.

When the enemy object process has been completed, the CPU 311 refers to the operation data 501 (step 110), thereby recognizing an input state of the operation button 14.

Referring to the operation data 501, the CPU 311 performs the bullet object process described above (step 115). Specifically, the CPU 311 determines whether an operation of shooting a bullet has been performed, based on the operation data 501 having been referred to in step 110. When the operation of shooting a bullet has been performed, the CPU 311 updates a position which is associated with the shape of the bullet object in the object data 507 so as to represent a predetermined appearance position. Further, in the bullet object process, when a bullet object having been already shot is moving, the CPU 311 determines a position to which the bullet object is to move, based on the bullet control algorithm. When the CPU 311 has determined the position to which the bullet object is to move, a position which is associated with the shape of the bullet object in the object data 507 is updated to so as to represent the position having been determined. Moreover, when the position to which the bullet object is to move has been determined, whether any of the bullet objects has hit any of the enemy objects Eo in the virtual space is determined, based on the determined position and the position of each of the enemy objects Eo having been determined in the enemy object process. When the CPU 311 has determined that any of the bullet objects has hit the enemy object Eo, a display is set so as to destroy and extinguish the enemy object Eo.

When the bullet object process has been completed, the CPU 311 is operable to capture the image-taken-by-outer-imaging-section. Og (step 120). Specifically, the CPU 311 instructs the outer imaging section (left) 23a to capture the image-taken-by-outer-imaging-section Og. The CPU 311 acquires the image-taken-by-outer-imaging-section Og having been captured by the outer imaging section (left) 23a in accordance with the instruction, and updates the image-taken-by-outer-imaging section data 502 stored in the main memory 32 so as to represent the image-taken-by-outer-imaging-section Og having been acquired.

When the image-taken-by-outer-imaging-section Og has been captured, the CPU 311 refers to the angular velocity data 503 stored in the main memory 32 (step 125).

Referring to the angular velocity data 503, the CPU 311 determines whether the game apparatus 10 has been greatly moved as described above (step 130). Specifically, the CPU 311 determines whether at least one of the angular velocities of rotations about the respective axes which are represented by the angular velocity data 503 having been referred to is greater than an angular velocity threshold value. When at least one of the angular velocities represented by the angular velocity data 503 is greater than the angular velocity threshold value, the CPU 311 determines that the game apparatus 10 has been greatly moved (Yes in step 130). On the other hand, when all the angular velocities represented by the angular velocity data 503 are lower than or equal to the angular velocity threshold value, the CPU 311 determines that the game apparatus 10 is not greatly moved (No in step 130).

When the CPU 311 determines that the game apparatus 10 has been greatly moved (Yes in step 130), the CPU 311 determines whether the stop flag is set as "off" (step 145). Specifically, the CPU 311 refers to the stop flag data 506 stored in the main memory 32, to determine whether the stop flag data 506 represents "off". When the CPU 311 determines that the stop flag data 506 represents "off", the CPU 311 determines that the stop flag is set as "off" (Yes in step 145). On the other hand, when the CPU 311 determines that the stop flag data 506 does not represent "off" (that the stop flag data 506 represents "on"), the CPU 311 determines that the stop flag is not set as "off" (No in step 145).

When the CPU 311 determines that the stop flag is not set as "off" (No in step 145), the CPU 311 sets the stop flag to "off" (step 150). Specifically, the CPU 311 updates the stop flag data 506 stored in the main memory 32 so as to represent "off". Thus, when the game apparatus 10 is determined as having been greatly moved, the CPU 311 records, in the main memory 32, that the user's point of view is not an optimal point of view.

When the CPU 311 has set the stop flag to "off" (step 150), or when the CPU 311 determines that the stop flag is set as "off" (Yes in step 145), the virtual camera distance Kk is determined as described above (step 155). Specifically, the CPU 311 refers to the virtual camera distance determination data 512 stored in the main memory 32, and determines the virtual camera distance Kk corresponding to the angular velocity represented by the angular velocity data 503 having been referred to in step 125. When the CPU 311 has determined the virtual camera distance Kk, the virtual camera distance data 505 stored in the main memory 32 is updated so as to represent the virtual camera distance Kk having been determined. Thus, the CPU 311 is able to immediately determine the virtual camera distance Kk for each of the left virtual camera Hk and the right virtual camera Mk when the game apparatus 10 is determined as having been greatly moved.

On the other hand, when the CPU 311 determines that the game apparatus 10 has not been greatly moved (No in step 130), the CPU 311 determines whether the stop flag is set as "on" (step 135). Specifically, the CPU 311 refers to the stop flag data 506 stored in the main memory 32, and determines whether the stop flag is set as "on". When the stop flag data 506 represent "on", the CPU 311 determines that the stop flag is set as "on" (Yes in step 135). On the other hand, when the stop flag data 506 does not represent "on", the CPU 311 determines that the stop flag is not set as "on" (that the stop flag is set as "off") (No in step 135).

When the CPU 311 determines that the stop flag is not set as "on" (No in step 135), the stop flag is set to "on" (step 140). Specifically, the CPU 311 updates the stop flag data 506 stored in the main memory 32 so as to represent "on". Thus, when the game apparatus 10 is determined as having not been greatly moved, the CPU 311 records, in the main memory 32, that the user's point of view is an optimal point of view.

When the CPU 311 determines that the stop flag is set as "on" (Yes in step 135), or when the CPU 311 has set the stop flag to "on" (step 140), the CPU 311 determines whether the time counting flag is set as "on" (step 170). Specifically, the CPU 311 refers to the time counting flag data 508 stored in the main memory 32, and determines whether the time counting flag data 508 represents "on". When the CPU 311 determines that the time counting flag data 508 represents "on", the CPU 311 determines that the time counting flag is set as "on" (Yes in step 170). On the other hand, when the time counting flag data 508 represents "off", the CPU 311 determines that the time counting flag is not set as "on" (that the time counting flag is set as "off") (No in step 170).

When the CPU 311 determines that the time counting flag is not set as "on" (No in step 170), the switching start time St is determined (step 175). Specifically, the CPU 311 calculates the switching time t which enables the virtual camera distance Kk represented by the virtual camera distance data 505 stored in the main memory 32 to be calculated in accordance with equation (1) represented by the distance curve data 510, and determines the switching start time St based on the switching time t. When the CPU 311 has determined the switching start time St, the CPU 311 updates and sets the switching start time data 511 so as to represent the switching start time St having been determined.

When the CPU 311 has determined the switching start time St, counting of the switching time t is started from the switching start time St (step 177). Thus, the CPU 311 can start to count the switching time t when counting of the switching time t as described above has not been started for switching from the planar view image to the stereoscopically visible image.

When counting of the switching time t is started, the CPU 311 sets the time counting flag to "on" (step 180). Specifically, the CPU 311 updates the time counting flag data 508 stored in the main memory 32 so as to represent "on". Thus, the CPU 311 starts switching from the planar view image to the stereoscopically visible image, and records, in the main memory 32, that the switching time t is being counted.

When the CPU 311 determines that the time counting flag is set as "on" (Yes in step 170), or when the CPU 311 sets the time counting flag to "on" (step 180), the switching time t is counted (step 185). Specifically, the CPU 311 updates the switching time data 509 so as to represent an elapsed time from the switching start time St, based on time counted by the RTC 38.

When the CPU 311 counts the switching time t, the CPU 311 determines whether the switching time t has reached a predetermined upper limit time (step 190). Specifically, the CPU 311 refers to the switching time data 509 stored in the main memory 32, and determines whether the switching time t represented by the switching time data 509 has reached the predetermined upper limit time.

When the CPU 311 determines that the switching time t has not reached the predetermined upper limit time (No in step 190), the CPU 311 calculates the virtual camera distance Kk (step 195). Specifically, the CPU 311 refers to the equation represented by the distance curve data 510 stored in the main memory 32, and the switching time t represented by the switching time data 509. Further, the CPU 311 substitutes, into the equation having been referred to, the switching time t having been referred to, to calculate the virtual camera distance Kk. The CPU 311 updates the virtual camera distance data 505 so as to represent the virtual camera distance Kk having been calculated. Thus, the CPU 311 is allowed to calculate the virtual camera distance Kk, based on equation (1), so as to gradually change the virtual camera distance Kk, when the switching time t is being counted, and the planar view image is being switched to the stereoscopically visible image.

On the other hand, when the CPU 311 determines that the switching time t has reached the predetermined upper limit time (Yes in step 190), the CPU 311 sets the time counting flag to "off" (step 200). Specifically, the CPU 311 updates the time counting flag data 508 stored in the main memory 32 so as to represent "off". Thus, the CPU 311 records, in the main memory 32, that counting of the switching time t has been completed after start of switching from the planar view image to the stereoscopically visible image.

When the CPU 311 has set the time counting flag to "off", the CPU 311 resets the switching time t to zero (step 205). Specifically, the CPU 311 updates and initializes the switching time data 509 stored in the main memory 32 such that the switching time t indicates zero.

When the CPU 311 has determined the virtual camera distance Kk (step 155), or when CPU 311 has calculated the virtual camera distance Kk (step 195), or when the CPU 311 has reset the switching time t to zero (step 205), the left virtual camera Hk is disposed in the virtual space (step 215). Specifically, the CPU 311 updates the imaging direction data 504 by adding the angular velocities of the rotations about the respective axes which are represented by the angular velocity data 503 having been referred to in step 125, to the rotation angles relative to the respective axes which are represented by the imaging direction data 504. When the imaging direction data 504 has been updated, the CPU 311 moves the left virtual camera Hk in the x-axis negative direction so as to be distanced from the originating point O of the virtual space by the virtual camera distance Kk. The CPU 311 disposes the left virtual camera Hk at the rotation angle relative to each axis which is represented by the imaging direction data 504 having been updated, by rotating, about the originating point O of the virtual space, the left virtual camera Hk having been moved. Thus, the CPU 311 is allowed to dispose the left virtual camera Hk in cooperation with the movement of the game apparatus 10 as described above.

When the CPU 311 has disposed the left virtual camera Hk, the CPU 311 disposes the right virtual camera Mk (step 220). Specifically, the CPU 311 updates the imaging direction data 504 by adding the angular velocities of the rotations about the respective axes which are represented by the angular velocity data 503 having been referred to in step 125, to the rotation angles relative to the respective axes which are represented by the imaging direction data 504. When the imaging direction data 504 has been updated, the CPU 311 moves the right virtual camera Mk in the x-axis positive direction so as to be distanced from the originating point O of the virtual space by the virtual camera distance Kk. The CPU 311 disposes the right virtual camera Mk at the rotation angle relative to each axis which is represented by the imaging direction data 504 having been updated, by rotating, about the originating point O of the virtual space, the right virtual camera Mk having been moved. Thus, the CPU 311 is allowed to dispose the right virtual camera Mk in cooperation with the movement of the game apparatus 10 as described above.

After the CPU 311 has reset the virtual camera distance Kk to zero (step 145), when the left virtual camera Hk and the right virtual camera Mk are disposed (step 215, step 220), the point of view of the left virtual camera Hk and the point of view of the right virtual camera Mk are able to be the same as described above. Further, after the CPU 311 has calculated the virtual camera distance Kk (step 195), when the left virtual camera Hk and the right virtual camera Mk are disposed (step 215, step 220), the distance between the left virtual camera Hk and the right virtual camera Mk can be gradually increased. Furthermore, after the CPU 311 determines that the switching time t has reached a predetermined time (Yes in step 190), when the left virtual camera Hk and the right virtual camera Mk are disposed (step 215, step 220), each of the left virtual camera Hk and the right virtual camera Mk can be disposed again so as to be distanced from the originating point O by the upper limit value Jt, that is, by the virtual camera distance Kk having been set in the initialization process.

When the CPU 311 has disposed the right virtual camera Mk, the image for a left eye and the image for a right eye are generated (step 225). Specifically, the CPU 311 disposes the enemy object Eo in the virtual space based on the position and the orientation having been set in the enemy object process. Further, the CPU 311 disposes, in the virtual space, the bullet objects at the positions, respectively, having been set in the bullet object process. Moreover, the CPU 311 determines the region Nr in the screen object based on the imaging direction of the left virtual camera Hk as described above, and texture-maps, to the region Nr, the image-taken-by-outer-imaging-section Og having been captured in step 120. Next, the CPU 311 performs a process of taking an image of the virtual space in which the enemy object Eo, the bullet object, and the screen object exist, by using the left virtual camera Hk having been disposed as described above. At this time, the image is taken, processed, and displayed so as to destroy and extinguish the enemy object Eo which is determined as having been hit by the bullet object. When the process of taking an image of the virtual space by using the left virtual camera Hk has been performed, the CPU 311 renders the image having been taken by the left virtual camera Hk, as the image for a left eye, in the VRAM 313, thereby updating the image-for-left-eye data 701. When the CPU 311 has updated the image-for-left-eye data 701, the CPU 311 determines the region Nr in the screen object based on the imaging direction of the right virtual camera Mk as describe above, and texture-maps, to the region Nr, the image-taken-by-outer-imaging-section Og having been captured in step 120. Next, the CPU 311 performs a process of taking an image of the virtual space in which the enemy object Eo, the bullet object, and the screen object which have been disposed as described above exist, by using the right virtual camera Mk having been disposed as described above. At this time, the image is taken, processed, and displayed so as to destroy and extinguish the enemy object Eo which is determined as having been hit by the bullet object. When the process of taking an image of the virtual space by using the right virtual camera Mk has been performed, the CPU 311 renders the image having been taken by the right virtual camera Mk, as the image for a right eye, in the VRAM 313, thereby updating the image-for-right-eye data 702.

When the CPU 311 has generated the image for the left eye and the image for the right eye, the images having been generated are displayed on the upper LCD 22 (step 227). Specifically, the CPU 311 outputs the image for the left eye and the image for the right eye having been rendered in the VRAM 313. The image for the left eye and the image for the right eye which have been outputted from the VRAM 313 are read by the LCD controller as described above, and are displayed on the upper LCD 22. The image for the left eye and the image for the right eye which have been rendered in the VRAM 313 are displayed as a planar view image on the upper LCD 22 when the virtual camera distance Kk for each of the left virtual camera Hk and the right virtual camera Mk represents a value less than the upper limit value Jt, as described above. On the other hand, the image for the left eye and the image for the right eye which have been rendered in the VRAM 313 are displayed as the stereoscopically visible image on the upper LCD 22, when the virtual camera distance Kk for each of the left virtual camera Hk and the right virtual camera Mk represents the upper limit value Jt, as described above.

When the CPU 311 has performed a process of displaying the image for the left eye and the image for the right eye on the upper LCD 22, the CPU 311 refers to the operation data 501 stored in the main memory 32 (step 230).

Referring to the operation data 501, the CPU 311 determines whether an operation for ending the game process has been performed by a user (step 230). Specifically, the CPU 311 determines whether the operation for ending the game process has been performed by the user, based on the operated state of the operation button 14 which is represented by the operation data 501 having been referred to.

When the CPU 311 determines that the operation for ending the game process has been performed by the user (Yes in step 235), the CPU 311 ends the execution of the game program. On the other hand, when the CPU 311 determines that the operation for ending the game process has not been performed by the user (No in step 235), the process is repeatedly performed from step 101.

Figure 12:
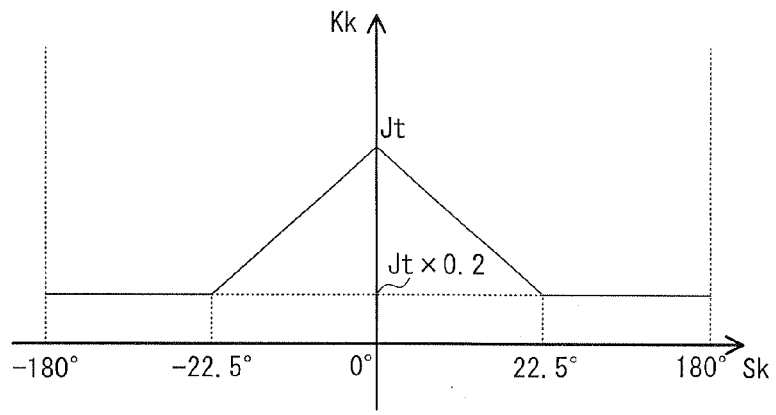
FIG. 12 is a diagram illustrating an exemplary relationship between a virtual camera distance and a horizontal rotation angle according to a second embodiment of the present invention.

The game apparatus 10 according to the first embodiment of the present invention has been described as above. The game apparatus 10 according to the present embodiment enables alleviation of a user's uncomfortableness which may be caused by a deviation occurring between the user's point of view and the optimal point of view due to the game apparatus 10 having been greatly moved. The game process of the present embodiment as shown in FIG. 11 and FIG. 12 is repeatedly performed at the process time unit intervals as described above.

Second Embodiment

Next, a game apparatus according to another exemplary embodiment (second embodiment) of the present invention will be described. The game apparatus 10 according to the first embodiment operates such that any of the angular velocities of rotations about the x, y, and z axes (see FIG. 1) is greater than or equal to an angular velocity threshold value, the planar view image is displayed. On the other hand, the game apparatus 10 according to the second embodiment operates such that the virtual camera distance Kk is controlled based on a rotation angle by which the game apparatus 10 rotates around the axis of gravity direction, to switch between the stereoscopically visible image and the planar view image.

[Outline of Information Processing]

Hereinafter, an outline of the information processing according to the present embodiment will be described with reference to FIG. 12 to FIG. 15. In the present embodiment, the game process is performed by the game apparatus 10 as an example of the information processing as in the first embodiment. The enemy object process, the bullet object process, and the process of texture-mapping the image-taken-by-outer-imaging-section Og to the screen object, among the processes performed in the game process described in the first embodiment, are also performed in the present embodiment. In the present embodiment, the process steps of disposing the virtual cameras, among the process steps performed in the game process described in the first embodiment, is performed in a manner different from that for the first embodiment.

In the present embodiment, in order to dispose the virtual camera, firstly, a process is performed for calculating a tilt of the x, y, and z axes (see FIG. 1) of the game apparatus 10 relative to the gravity direction (hereinafter, simply referred to as a tile of the game apparatus 10), based on the acceleration detected by the acceleration sensor 39. As a method for calculating the tilt of the game apparatus 10, any method as is well known can be used in which the tile is calculated by performing a process on the acceleration for each axis based on the acceleration outputted by the acceleration sensor 39. For example, when the tilt is calculated based on the acceleration sensor 39 being in one of a static state or a dynamic state, the acceleration based on the movement of the acceleration sensor 39 is eliminated by a predetermined process being performed, thereby enabling the tilt of the game apparatus 10 relative to the gravity direction to be obtained.

Further, in the present embodiment, the process is performed for setting the imaging direction of the virtual camera based on the angular velocity of a rotation about each axis of the game apparatus 10 which has been detected by the angular velocity sensor 40 as described in the first embodiment. The imaging direction of the virtual camera is represented by the imaging direction data 504 described in the first embodiment. As described in the first embodiment, each rotation angle represented by the imaging direction data 504 is set to zero when the game apparatus 10 is powered on, and represents the rotation angle relative to each axis of the game apparatus 10 which is calculated in real time.

In the present embodiment, the rotation angle of the game apparatus 10 around the axis of the gravity direction is calculated, as a horizontal rotation angle Sk, based on the tilt of the game apparatus 10 as described above, and the rotation angle of the game apparatus 10 relative to each axis of the game apparatus 10. The manner for calculating the horizontal rotation angle Sk based on the tilt of the game apparatus 10 and the rotation angle of the game apparatus 10 relative to each axis of the game apparatus 10 may be any method as is well known. For example, a method may be used in which a coordinate system based on the xyz-axes of the game apparatus 10, and a coordinate system (xyz-axes) of the real space which is different from a coordinate system based on the axes (xyz-axes) of the virtual space are defined. An example of the coordinate system of the real space includes a coordinate system in which the gravity direction is represented as z-axis, and the plane surface to which the z-axis is normal is represented as an x-y plane. A method may be used in which the rotation angles relative to the axes of the game apparatus 10 are transformed to the rotation angles relative to the x, y, and z axes, respectively, of the real space, based on the tilt of the game apparatus 10. In this case, the rotation angle about the z-axis in the coordinate system defined as the coordinate system of the real space is the horizontal rotation angle Sk.

In the present embodiment, the virtual camera distance Kk is determined based on the horizontal rotation angle Sk having been calculated as described above. FIG. 12 is a diagram illustrating an exemplary relationship between the horizontal rotation angle Sk and the virtual camera distance Kk according to the present embodiment. In the present embodiment, as shown in FIG. 12 by way of example, the virtual camera distance Kk is changed within a range from the upper limit value Jt to a value representing 20% of the upper limit value Jt so as to be proportional to the absolute value of the horizontal rotation angle Sk when the horizontal rotation angle Sk is in a range of 0 degree±22.5 degrees.

Figure 13:
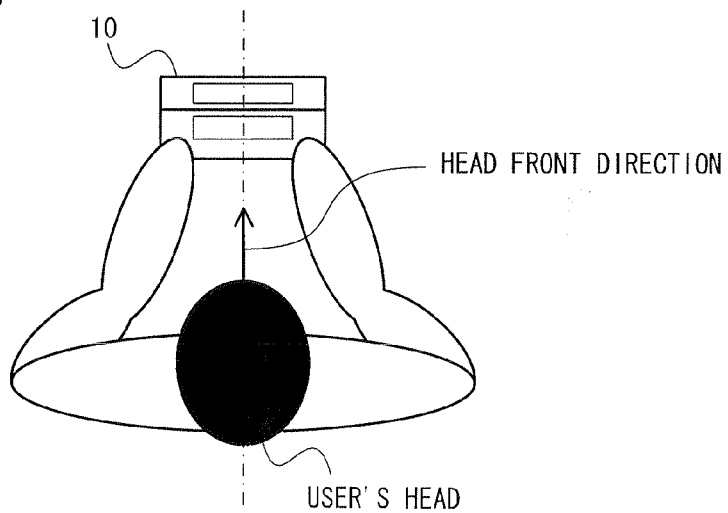
FIG. 13 is a diagram illustrating an exemplary usage of the game apparatus according to the embodiments of the present invention.
Figure 14:
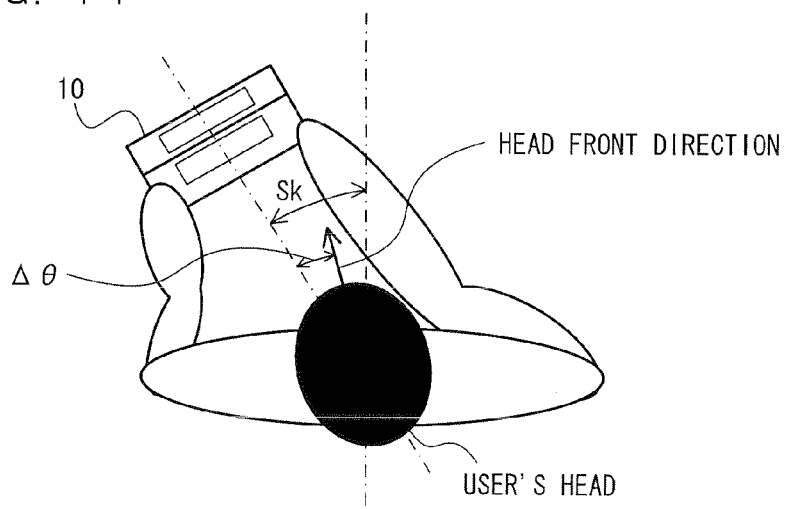
FIG. 14 is a diagram illustrating an exemplary usage of the game apparatus according to the embodiments of the present invention.

FIG. 13 and FIG. 14 are diagrams schematically illustrating a user of the game apparatus 10 as viewed vertically from the above. The user shown in FIG. 13 and FIG. 14 is seated. For example, a case is assumed in which the user starts the game process on the game apparatus 10 in the state shown in FIG. 13, and the user twists his/her upper body while holding the game apparatus 10 as shown in FIG. 14 so as to aim at the enemy object Eo as described in the first embodiment. In this case, as shown in FIG. 14 by way of example, the user can not necessarily move his/her head perfectly in accordance with the rotation angle of the game apparatus 10 having been horizontally rotated. In the example shown in FIG. 14, a deviation Δθ occurs between the direction of the front of the head and the horizontal rotation angle Sk of the game apparatus 10.

In the example shown in FIG. 14, as described in the first embodiment, the user's point of view deviates from the optimal point of view. Therefore, as shown in FIG. 7 by way of example, the stereoscopically visible image displayed on the upper LCD 22 is blurred, and the blurred image is viewed by the user. Further, the greater the rotation of the game apparatus 10 in the horizontal direction is (the greater the absolute value of the horizontal rotation angle Sk is), the greater the deviation from the direction of the head is likely to be. Therefore, in the present embodiment, as shown in FIG. 12 by way of example, the virtual camera distance Kk is changed so as to be proportional to the absolute value of the horizontal rotation angle Sk. Thus, the stereoscopically visible image can be gradually switched to the planar view image in accordance with increase of the deviation caused by the user horizontally rotating the game apparatus 10. The user's uncomfortableness can be alleviated in accordance with the magnitude of the rotation angle in the horizontal direction.

Figure 15:
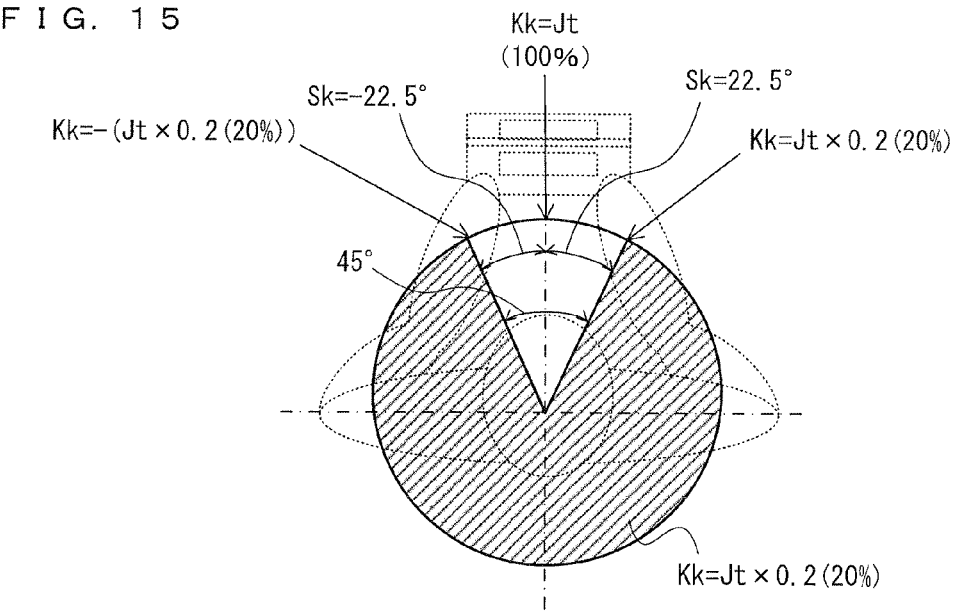
FIG. 15 is a diagram illustrating an exemplary relationship between a virtual camera distance and a horizontal rotation angle according to a second embodiment of the present invention.

FIG. 15 is a diagram illustrating an association between the relationship shown in FIG. 12 by way of example, and the schematic diagram shown in FIG. 13. As shown in FIG. 15 by way of example, in the present embodiment, when a user rotates the game apparatus 10 from the front of the user in the positive direction such that the horizontal rotation angle Sk indicates 22.5 degrees, the virtual camera distance Kk is reduced from the upper limit value it to 20% of the upper limit value it in a proportional relationship. Further, in the present embodiment, when a user rotates the game apparatus 10 from the front of the user in the negative direction such that the horizontal rotation angle Sk indicates −22.5 degrees, the virtual camera distance Kk is reduced from the upper limit value it to 20% of the upper limit value Jt in a proportional relationship. Further, in the present embodiment, when the horizontal rotation angle Sk is outside a range from −22.5 degrees to +22.5 degrees, the virtual camera distance Kk is set to a constant value corresponding to 20% of the upper limit value it (diagonal line portion in FIG. 15). That is, in the present embodiment, the lower limit value of the virtual camera distance Kk is defined as 20% of the upper limit value Jt.

When the image for a left eye and the image for a right eye which have a parallax therebetween in the horizontal direction (the x-axis direction shown in FIG. 1) of the game apparatus 10 are viewed from a point of view different from the optimal point of view, the stereoscopically visible image is viewed as a blurred image by the user. Therefore, in the present embodiment, only the deviation in the horizontal direction is considered without considering the deviation between the user's point of view and the optimal point of view in the direction, such as the vertical direction, different from the horizontal direction, and the virtual camera distance Kk is determined based on the horizontal rotation angle Sk only.

[Data to be Stored in Main Memory]

Next, data to be stored in the main memory 32 and the VRAM 313 in accordance with the game program according to the present embodiment being executed by the CPU 311 will be described with reference to FIG. 16 prior to description of a specific operation performed by the CPU 311 of the game apparatus 10.

Figure 16:
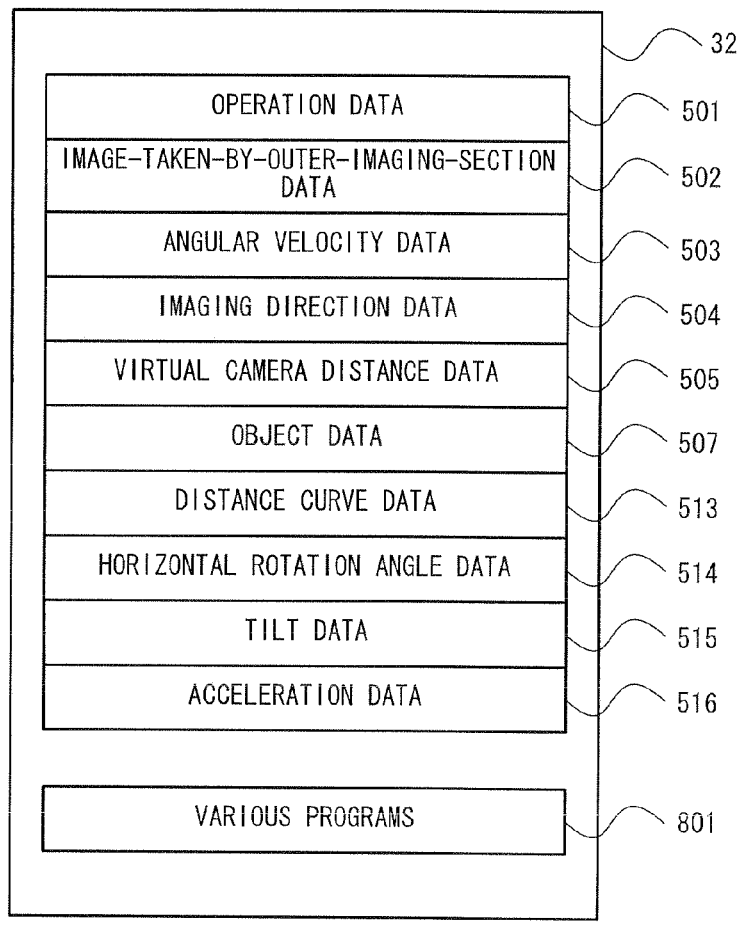
FIG. 16 is a diagram illustrating an exemplary memory map according to the second embodiment of the present invention.

As shown in FIG. 16 by way of example, the operation data 501, the image-taken-by-outer-imaging-section data 502, the angular velocity data 503, the imaging direction data 504, the virtual camera distance data 505, the object data 507, the distance curve data 513, horizontal rotation angle data 514, tilt data 515, acceleration data 516, and various programs 801 are stored in the main memory 32. Among the data and programs shown in FIG. 16, the same data and programs as described in the first embodiment are denoted by the same reference numerals, and the description thereof is not given.

The distance curve data 513 indicates association between the switching time t and the virtual camera distance Kk for each of the left virtual camera Hk and the right virtual camera Mk, which is used for switching from the planar view image to the stereoscopically visible image, as described in the first embodiment. However, in the present embodiment, the distance curve data 513 represents association between the horizontal rotation angle Sk and the virtual camera distance Kk as shown in FIG. 12 by way of example, unlike the distance curve data 510 of the first embodiment. The distance curve data 513 is read when the game program is read from the internal data storage memory 35 as described below.

The horizontal rotation angle data 514 represents the horizontal rotation angle Sk which is calculated by the CPU 311 as the rotation angle of the game apparatus 10 in the horizontal direction of the real space as described above.

The tilt data 515 represents a tilt of each axis (see FIG. 1) of the game apparatus 10 relative to the gravity direction. The tilt is calculated by the CPU 311 based on the acceleration detected by the acceleration sensor 39.

The acceleration data 516 represents an acceleration for each of the x, y and z axes, and the acceleration is acquired by the acceleration sensor 39 at the process unit time intervals. The acceleration data 516 is acquired from the acceleration sensor 39 and is stored in the main memory 32 at the process unit time intervals.

Various programs 801 are programs executed by the CPU 311. For example, the game program for causing the CPU 311 to perform the game process according to the present embodiment as described above is stored in the main memory 32 as an exemplary one of the various programs 801. Further, the enemy control algorithm and the bullet control algorithm as described in the first embodiment are contained in the game program stored in the main memory 32.

[Data to be Stored in VRAM]

In the present embodiment, data stored in the VRAM 313 is the image-for-left-eye data 701 and the image-for-right-eye data 702 as described in the first embodiment, and the description thereof is not given.

[Game Process]

Figure 17:
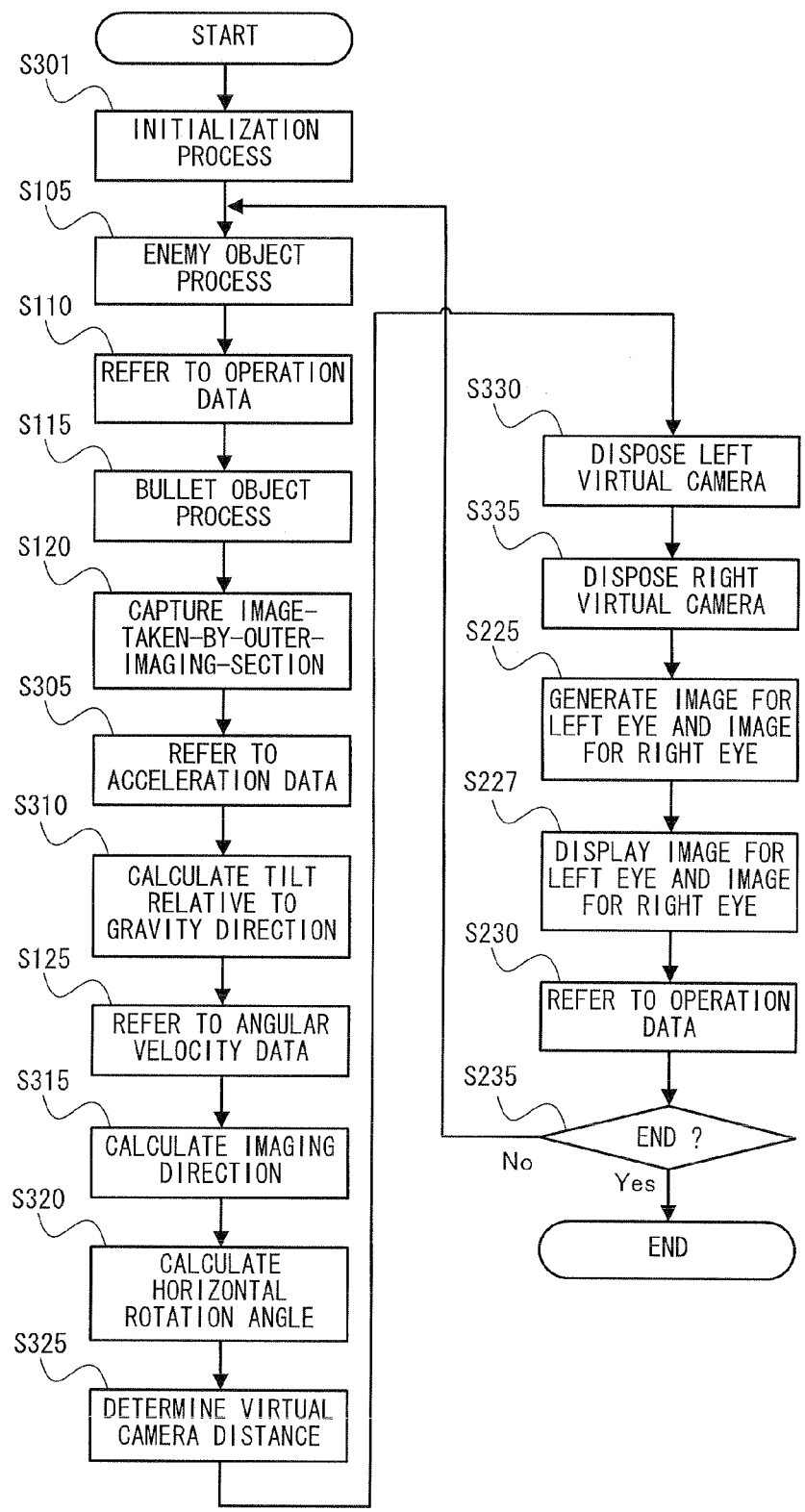
FIG. 17 is a diagram illustrating an exemplary flow chart of a display control process performed by the CPU of the game apparatus executing an information processing program according to the second embodiment of the present invention.

Next, a specific operation performed by the CPU 311 of the game apparatus 10 according to the present embodiment will be described. Firstly, when the game apparatus 10 is powered on, the boot program (not shown) is executed by the CPU 311. Thus, the game program stored in the internal data storage memory 35 is loaded and stored in the main memory 32. The game program stored in the main memory 32 is executed by the CPU 311, thereby performing a process shown in flow chart of FIG. 17. FIG. 17 is a flow chart showing an exemplary game process performed by the CPU 311 executing the game program. In FIG. 17, step is abbreviated as "S". Further, in FIG. 17, the same process steps as shown in the flow chart for the game process of the first embodiment are denoted by the same reference numerals, and the detailed description thereof is not given.

When the game process is started, the CPU 311 firstly performs the initialization process (step 301). Specifically, the CPU 311 clears an image represented by the image-taken-by-outer-imaging-section data 502. Further, the CPU 311 sets, to zero, values represented by the angular velocity data 503, the imaging direction data 504, the horizontal rotation angle data 514, and the tilt data 515. Moreover, the CPU 311 sets the virtual camera distance Kk represented by the virtual camera distance data 505 so as to represent the upper limit value Jt. Furthermore, the CPU 311 erases all data stored in the VRAM 313. The CPU 311 reads the distance curve data 513 from the internal data storage memory 510, and stores the distance curve data 513 in the main memory 32.

In the initialization process, the virtual camera distance Kk represented by the virtual camera distance data 505 is set to the upper limit value Jt by the CPU 311. Therefore, immediately after the start of the game process, the stereoscopically visible image is displayed on the upper LCD. Moreover, in the initialization process, the CPU 311 sets, to zero, a value represented by the imaging direction data 504. Therefore, each rotation angle represented by the imaging direction data 504 can be calculated as zero when the game apparatus 10 is powered on as described above. Further, the horizontal rotation angle Sk as described above represents an angle to which each rotation angle represented by the imaging direction data 504 has been transformed as described above. Therefore, the horizontal rotation angle Sk is also calculated as zero so as to represent the reference direction when the game apparatus 10 is powered on, similarly to the rotation angle represented by the imaging direction data 504.

Following the initialization process, the CPU 311 performs the enemy object process up to the process of capturing the image-taken-by-outer-imaging-section Og as in the first embodiment (step 105 to step 120).

When the image-taken-by-outer-imaging-section Og has been captured, the CPU 311 refers to the acceleration data 516 stored in the main memory 32 (step 305).

Referring to the acceleration data 516, the CPU 311 calculates the tilt of the game apparatus 10 (step 310). Specifically, the CPU 311 calculates the tile of each axis (see FIG. 1) of the game apparatus 10 relative to the gravity direction, based on the acceleration in each axial direction which is represented by the acceleration data 516 having been referred to, as described above. When the CPU 311 has calculated the tile of the game apparatus 10, the CPU 311 updates the tilt data 515 so as to represent the tilt having been calculated.

When the CPU 311 has calculated the tilt of the game apparatus 10, the CPU 311 refers to the angular velocity data 503 stored in the main memory 32 as in the first embodiment (step 125).

Referring to the angular velocity data 503, the CPU 311 calculates the imaging direction of the virtual camera (step 315). Specifically, the CPU 311 adds the angular velocities of rotations about the axes which are represented by the angular velocity data 503 having been referred to in step 125, to the rotation angles relative to the axes, respectively, which are represented by the imaging direction data 504, thereby updating the imaging direction data 504.

When the CPU 311 has calculated the imaging direction of the virtual camera, the CPU 311 calculates the horizontal rotation angle Sk (step 320). Specifically, the CPU 311 calculates the horizontal rotation angle Sk, based on the tilt represented by the tilt data 515, and each rotation angle represented by the imaging direction data 504, as described above. When the CPU 311 has calculated the horizontal rotation angle Sk, the CPU 311 updates the horizontal rotation angle data 514 so as to represent the horizontal rotation angle Sk having been calculated.

When the CPU 311 has calculated the horizontal rotation angle Sk, the CPU 311 determines the virtual camera distance Kk (step 325). Specifically, the CPU 311 refers to distance curve data 513 and the horizontal rotation angle data 514 which are stored in the main memory 32. The CPU 311 determines and sets the virtual camera distance Kk corresponding to the horizontal rotation angle Sk represented by the horizontal rotation angle data 514 having been referred to, based on the relationship (relationship shown in FIG. 12 in the present embodiment) represented by the distance curve data 513 having been referred to. When the CPU 311 has determined the virtual camera distance Kk, the CPU 311 updates the virtual camera distance data 505 so as to represent the virtual camera distance Kk having been determined.

When the CPU 311 has determined the virtual camera distance Kk, the CPU 311 disposes the left virtual camera Hk in the virtual space (step 330). Specifically, the CPU 311 moves the left virtual camera Hk from the originating point O of the virtual space in the x-axis negative direction so as to be distanced from the originating point O by the virtual camera distance Kk represented by the virtual camera distance data 505. The CPU 311 disposes the left virtual camera Hk at the rotation angle relative to each axis which is represented by the imaging direction data 504, by rotating, about the originating point O of the virtual space, the left virtual camera Hk having been moved. Thus, the CPU 311 is allowed to dispose the left virtual camera Hk in cooperation with the movement of the game apparatus 10.

When the CPU 311 has disposed the left virtual camera Hk in the virtual space, the CPU 311 disposes the right virtual camera Mk in the virtual space (step 335). Specifically, the CPU 311 moves the right virtual camera Mk from the originating point O of the virtual space in the x-axis positive direction so as to be distanced from the originating point O by the virtual camera distance Kk represented by the virtual camera distance data 505. The CPU 311 disposes the right virtual camera Mk at the rotation angle relative to each axis which is represented by the imaging direction data 504, by rotating, about the originating point O of the virtual space, the right virtual camera Mk having been moved. Thus, the CPU 311 is allowed to dispose the right virtual camera Mk in cooperation with the movement of the game apparatus 10.

When the CPU 311 has disposed the left virtual camera Hk and the right virtual camera Mk, the CPU 311 generates the image for a left eye and the image for a right eye in the same manner as described in the first embodiment (step 225), and displays the image for the left eye and the image for the right eye on the upper LCD 22 also in the same manner as described in the first embodiment (step 227).

When the CPU 311 has displayed the image for the left eye and the image for the right eye on the upper LCD 22, the CPU 311 refers to the operation data 501 stored in the main memory 32 as in the first embodiment, and determines whether a user has performed an operation for ending the game process (step 230 to step 235). When the CPU 311 determines that the operation for ending the game process has been performed by the user (YES in step 235), the CPU 311 ends the execution of the game program, as in the first embodiment. On the other hand, when the CPU 311 determines that the operation for ending the game process has not been performed by the user (No in step 235), the CPU 311 repeatedly performs the process step of step 301 and the following process steps, as in the first embodiment.

The game apparatus 10 according to the second embodiment of the present invention has been described as above. The game apparatus 10 according to the present embodiment can alleviate a user's uncomfortableness, in accordance with a magnitude of a deviation between the user's point of view and the optimal point of view which occurs due to the user rotating the game apparatus 10 in the horizontal direction. The game process of the present embodiment shown in FIG. 17 is repeatedly performed at the process time unit intervals as described above.

In the second embodiment, the lower limit value corresponding to 20% of the upper limit value Jt is calculated when the horizontal rotation angle Sk indicates predetermined values which are ±22.5 degrees. However, the predetermined value may represent any angle. Further, the lower limit value may be any value different from 20% of the upper limit value Jt.

Figure 18:
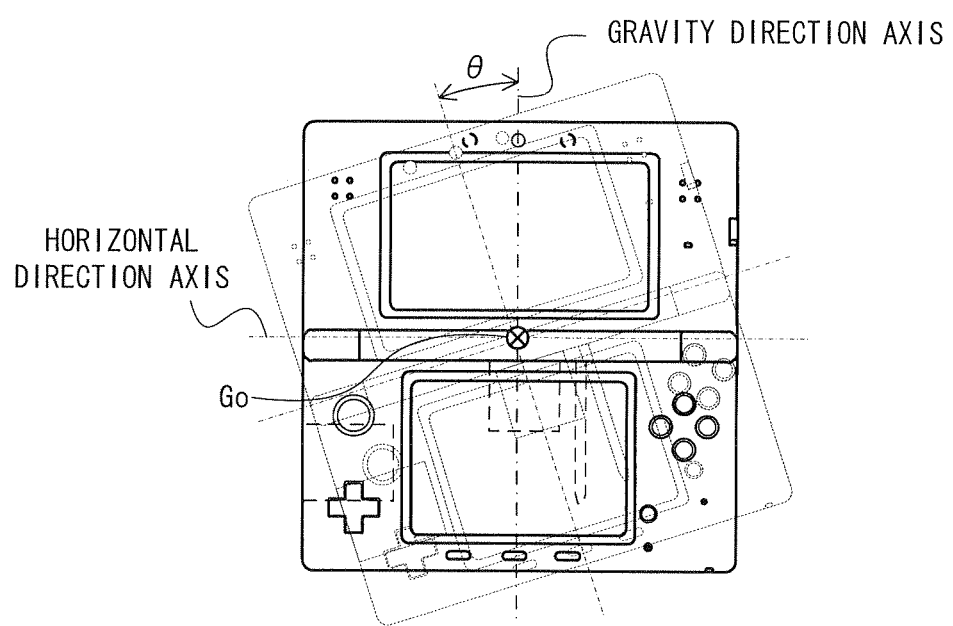
FIG. 18 is a diagram illustrating an exemplary usage of the game apparatus according to the embodiments of the present invention.

Further, in the second embodiment, the virtual camera distance Kk is gradually changed in accordance with the horizontal rotation angle Sk which is calculated based on the rotation of the game apparatus 10 about the axis of the gravity direction. However, in another embodiment, as shown in FIG. 18 by way of example, the virtual camera distance Kk may be gradually changed in accordance with the rotation angle θ which is calculated based on the rotation of the game apparatus 10 about the axis Go of the direction normal to the plane formed by the axis of the gravity direction and the axis of the horizontal direction in the real space. In this case, for example, the same relationship as the relationship between the horizontal rotation angle Sk and the virtual camera distance Kk as shown in FIG. 12 by way of example may be used, or another predetermined relationship may be preset, to determine the virtual camera distance Kk corresponding to the rotation angle θ. For example, the following relationship can be used. That is, when the game apparatus 10 is rotated, from the rotation angle θ indicating zero to the rotation angle θ indicating 90 degrees, about the axis Go of the direction normal to the plane (namely, when the game apparatus 10 is rotated 90 degrees about the z-axis shown in FIG. 1, and vertically held), the virtual camera distance Kk is proportionally reduced from the upper limit value Jt to 0% of the upper limit value Jt (that is, such that the virtual camera distance Kk indicates zero).

The stereoscopically visible image is viewed as a stereoscopic image when the image for a left eye and the image for a right eye which have a parallax therebetween in the horizontal direction (x-axis direction in FIG. 1) of the game apparatus 10 are viewed from an optimal point of view as described in the second embodiment. Accordingly, as shown in FIG. 18 by way of example, when the game apparatus 10 is rotated about the axis Go of the direction normal to the plane, a deviation occurs between the direction of the parallax of the stereoscopically visible image and the direction of the parallax between both of the user's eyes, so that the stereoscopically visible image is viewed as a blurred image by the user. Therefore, as described above, in a case where the virtual camera distance Kk is changed in accordance with the rotation angle θ which is calculated based on the rotation of the game apparatus 10 about the axis Go of the direction normal to the plane, even when a misalignment occurs between the optimal point of view and the user's point of view, a user's uncomfortableness can be alleviated as in the second embodiment.

Further, the rotation angle relative to an axis of any predetermined direction, different form the axis of the gravity direction and the axis Go of the direction normal to the plane as described above, may be calculated in a well-known conventional method when the predetermined direction can be used for alleviating a user's uncomfortableness. In this case, the virtual camera distance Kk may be changed in accordance with the rotation angle having been calculated.

For example, in a process of gradually changing the virtual camera distance Kk in accordance with the horizontal rotation angle Sk as described in the second embodiment, when the game apparatus 10 has been greatly moved, the process of gradually changing the virtual camera distance Kk may be stopped, and the display may be immediately switched to the planar view display, as described in the first embodiment. Thus, also in the second embodiment, the user's uncomfortableness can be alleviated as in the first embodiment. Further, in addition to the simple combination of the first embodiment with the second embodiment, the process of changing the virtual camera distance Kk in accordance with the rotation angle θ relative to the axis Go of the direction normal to the plane as described above can be further combined with the combination of the first embodiment with the second embodiment.

Further, for example, in the process of gradually changing the virtual camera distance Kk in accordance with the horizontal rotation angle Sk as described in the second embodiment, when the game apparatus 10 has been greatly moved, the process of gradually changing the virtual camera distance Kk may be stopped and the display may be immediately switched to the planar view display, as described in the first embodiment, and thereafter the process of gradually changing the virtual camera distance Kk may be recommenced. More specifically, after the process of gradually changing the virtual camera distance Kk is stopped, when all the angular velocities of the rotations about the respective axes which are detected by the angular velocity sensor 40 become less than the angular velocity threshold value, the process of gradually changing the virtual camera distance Kk as described in the second embodiment may be recommenced. The virtual camera distance Kk used at the recommencement may be the virtual camera distance Kk which have been used when the process of gradually changing the virtual camera distance Kk has been stopped, or may be the virtual camera distance Kk indicating the upper limit value Jt. When the virtual camera distance Kk indicating the upper limit value Jt is used at the recommencement, the horizontal rotation angle Sk needs to be reset to zero at the recommencement. Specifically, the direction used at the recommencement is used as the reference direction, and the rotation angle relative to the reference direction needs to be calculated as the horizontal rotation angle Sk. Moreover, for example, when a game process different from the game process described above, such as a game process in which a player character is moved, in the virtual space, to the position based on the movement of the game apparatus 10 and in the direction based on the movement of the game apparatus 10, is being performed, the setting of the reference direction may be performed at any time. Thus, the user's uncomfortableness can be alleviated in any state, such as a state in which the player character is being moved in the proper direction.

Moreover, in the above description, the virtual camera distance Kk is changed so as to switch between the planar view image and the stereoscopically visible image. However, any parameter associated with the parallax for allowing the stereoscopically visible image to be stereoscopically viewed may be changed as described above instead of the virtual camera distance Kk, when the parameter can be used for switching between the planar view image and the stereoscopically visible image. Examples of the parameters associated with the parallax as described above include the angle which is formed by a straight line connecting between the gazing point and the point of view of the virtual camera for generating one of the image for a left eye or the image for a right eye, and the straight line connecting between the gazing point and the point of view of the virtual camera for generating the other of the image for the left eye or the image for the right eye.

In the first embodiment, when at least one of the angular velocities of the rotations about the respective axes which are detected by the angular velocity sensor 40 is greater than or equal to the angular velocity threshold value, the image is switched to the planar view image. However, in another embodiment, when at least two of or all of the angular velocities are greater than or equal to the angular velocity threshold values, respectively, the game apparatus 10 may be determined as having been greatly moved, and the image may be switched to the planar view image.

Further, in the first embodiment, when at least one of the angular velocities of the rotations about the respective axes which are detected by the angular velocity sensor 40 is greater than or equal to the angular velocity threshold value, the image is switched to the planar view image. However, in another embodiment, when at least one of, at least two of, or all of the accelerations in the respective axial directions which are detected by the acceleration sensor 39 is greater than or equal to a predetermined acceleration threshold value, the game apparatus 10 may be determined as having been greatly moved, and the image may be switched to the planar view image.

Further, in the first embodiment and the second embodiment, only the imaging direction of each of the left virtual camera Hk and the right virtual camera Mk is set in accordance with the movement of the game apparatus 10. However, in another embodiment, at least one of the imaging direction or position of each of the left virtual camera Hk and the right virtual camera Mk, may be set in accordance with the movement of the game apparatus 10. When the position of each of the left virtual camera Hk and the right virtual camera Mk is set, an acceleration in the direction of each of the x, y, and z axes (see FIG. 1) of the game apparatus 10 is detected by using the acceleration sensor 39, and a movement distance in the direction of each of the x, y, and z axes is calculated based on the acceleration. Thus, the position of each of the left virtual camera Hk and the right virtual camera Mk can be set in accordance with the calculated movement distance in the direction of each axis of the game apparatus 10. In this case, needless to say, when at least one of, at least two of or all of the accelerations in the directions of the respective axes which are detected by the acceleration sensor 39 is greater than or equal to a predetermined acceleration threshold value, the game apparatus 10 is determined as having been greatly moved, and the image may be switched to the planar view image, as described above.

In the first embodiment, the planar view image is switched to the stereoscopically visible image, by using equation (1) as described above. However, in another embodiment, another equation or relationship may be used which enables the virtual camera distance Kk to increase as the switching time t elapses, thereby switching from the planar view image to the stereoscopically visible image.

In the second embodiment, a predetermined relationship is used in which the virtual camera distance Kk simply decreases as the absolute value of the horizontal rotation angle Sk increases. However, in another embodiment, another relationship may be used in which the virtual camera distance Kk decreases as the absolute value of the horizontal rotation angle Sk increases. Further, in the second embodiment, the relationship is used in which the virtual camera distance Kk in the positive region and the virtual camera distance Kk in the negative region are changed so as to be symmetrical with respect to the horizontal rotation angle Sk indicating zero. However, an asymmetric relationship may be used.

Further, in a case where switching between the planar view image and the stereoscopically visible image is performed in accordance with the horizontal rotation angle Sk, the image may be immediately switched to the planar view image when the absolute value of the horizontal rotation angle Sk becomes greater than or equal to a predetermined threshold value, instead of gradual increase or gradual reduction as described in the second embodiment.

In the above description, switching between the planar view image and the stereoscopically visible image is performed in the game process. However, in another embodiment, the switching may be performed in any process. For example, the switching may be performed in the process for collecting images of faces as described in the first embodiment, or in the process for determining the enemy object Eo. Further, needless to say, even when an object moving in the virtual space does not exist, a user's uncomfortableness caused by switching between the planar view image and the stereoscopically visible image can be alleviated as described above in the first embodiment.

In the above description, the switching between the stereoscopically visible image and the planar view image is performed regardless of whether the 3D adjustment switch 25 is operated. However, in another embodiment, when a display mode is switched, by a user, to a display mode for displaying the planar view image by using the 3D adjustment switch 25 in a state where the CPU 311 is performing a process for switching between the stereoscopically visible image and the planar view image, the planar view display may be made as described in the first embodiment and the second embodiment. Thus, a user's uncomfortableness caused by the game apparatus can be eliminated in accordance with the user's own determination.

Further, in the first embodiment, when the game apparatus 10 has been greatly moved, the virtual camera distance Kk based on the angular velocity is set. However, in another embodiment, when the game apparatus 10 has been greatly moved, the virtual camera distance Kk may be immediately set to zero. Thus, when the game apparatus 10 has been greatly moved, the image for a left eye and the image for a right eye are immediately displayed as the same image, and immediate elimination of the user's uncomfortableness can be ensured.

In the first embodiment, the virtual camera distance Kk calculated, based on the angular velocity, for the switching from the stereoscopically visible image to the planar view image is changed so as to become the upper limit value Jt when the upper limit time has elapsed since the switching start time St. However, in another embodiment, the upper limit time at which the virtual camera distance Kk becomes the upper limit value Jt may be determined based on the virtual camera distance Kk obtained when the switching from the planar view image to the stereoscopically visible image is started. In this case, the upper limit time may be determined so as to range from zero to one second, or may be set to another time.

In the above description, an exemplary case is described in which the image-taken-by-outer-imaging-section Og is texture-mapped to the screen object at the process unit time intervals. However, in another embodiment, the image-taken-by-outer-imaging-section Og may be displayed as a background, as it is, on the display screen of the upper LCD 22, and display objects such as the enemy object Eo and the bullet object may be rendered so as to be superimposed thereon.

Furthermore, in the above-description, the present invention is applied to the hand-held game apparatus 10. However, the present invention is not limited thereto. The present invention is applicable to a stationary game apparatus and a mobile information terminal such as a mobile phone, a personal handy-phone system (PHS), and a PDA. Moreover, the present invention is applicable to a stationary game device and a personal computer.

While the invention has been described in detail, the foregoing description is in all aspects illustrative and not restrictive. It is understood that numerous other modifications and variations can be devised without departing from the scope of the invention. It should be understood that the scope of the present invention is defined only by the appended claims. It is also understood that the one skilled in the art can implement the present invention in the equivalent range based on the description of the specific embodiments of the present invention, and the common technological knowledge. Further, it should be understood that the terms used in the present specification have meanings generally used in the art unless otherwise specified. Therefore, unless otherwise defined, all the jargons and technical terms used in the present specification have the same meanings as those generally understood by one skilled in the art of the present invention. In the event of nay contradiction, the present specification (including the definitions) precedes.

What is claimed is:

1. A non-transitory computer-readable storage medium having stored therein an information processing program executed by a computer of a hand-held information processing apparatus, the information processing program, when executed, causing the computer to provide functionality comprising:

display control for performing, by using a display device, one of a planar view display and a stereoscopically visible display, to display a display image;

movement acquisition for acquiring movement data representing a movement of the information processing apparatus;

virtual camera setting for setting at least one of a position and/or an imaging direction of two virtual cameras disposed in a virtual space in cooperation with the movement of the information processing apparatus which is represented by the movement data;

comparison for comparing a value represented by the movement data to a predetermined value; and switching for switching a display of the display image performed by the display control between the planar view display and the stereoscopically visible display, based on the results of comparison between the value represented by the movement data and the predetermined value, wherein the display image is taken by the virtual camera(s) so as to represent the virtual space, when the value represented by the movement data is greater than or equal to the predetermined value, the switching immediately switches the stereoscopically visible display to the planar view display, when the value represented by the movement data is less than the predetermined value, the switching gradually returns the planar view display to the stereoscopically visible display, the display control displays, as the display image, an image for a left eye and an image for a right eye which have been generated by using the two virtual cameras which are spaced from each other by a predetermined distance in the virtual space when the stereoscopically visible display is performed, and when the switching switches the display of the display image performed by the display control by gradually changing from the planar view display to the stereoscopically visible display, the display device is caused to display, as the display image, a stereoscopically visible image including the image for the left eye and the image for the right eye having been generated by gradually increasing the distance between the two virtual cameras.

2. The non-transitory computer-readable storage medium having the information processing program stored therein according to claim 1, wherein the computer is caused to further provide functionality comprising calculation for calculating, based on the acquired movement data, a rotation angle about an axis of a predetermined direction relative to a predetermined reference direction in a space in which the information processing apparatus exists, and the switching switches the display of the display image performed by the display control between the planar view display and the stereoscopically visible display, based on the rotation angle.

3. The non-transitory computer-readable storage medium having the information processing program stored therein according to claim 2, wherein the switching switches the display of the display image performed by the display control by changing from the stereoscopically visible display to the planar view display in accordance with the rotation angle increasing.

4. The non-transitory computer-readable storage medium having the information processing program stored therein according to claim 3, wherein
when the determination determines that the value represented by the movement data is not less than the predetermined value, the switching stops switching the display of the display image performed by the display control based on the rotation angle, and the display control performs the planar view display of the display image, and when the determination determines that the value represented by the movement data is less than the predetermined value, the switching recommences switching of the display based on the rotation angle.

5. The non-transitory computer-readable storage medium having the information processing program stored therein according to claim 4, wherein the calculation recommences calculation with the rotation angle corresponding to the reference direction, when the display control recommences the switching of the display of the display image based on the rotation angle.

6. The non-transitory computer-readable storage medium having the information processing program stored therein according to claim 2, wherein the switching switches the display of the display image performed by the display control so as to perform the planar view display when the rotation angle is greater than or equal to a predetermined angle.

7. The non-transitory computer-readable storage medium having the information processing program stored therein according to claim 2, wherein
the computer is caused to further provide functionality comprising reception for receiving, from a user, an instruction for switching between the stereoscopically visible display and the planar view display, and
the switching switches the display of the display image performed by the display control to the planar view display when the instruction for switching to the planar view display is received by the reception.

8. The non-transitory computer-readable storage medium having the information processing program stored therein according to claim 2, wherein the calculation calculates, as the rotation angle, a rotation angle about an axis of the gravity direction in the space in which the information processing apparatus exists.

9. The non-transitory computer-readable storage medium having the information processing program stored therein according to claim 2, wherein the calculation calculates, as the rotation angle, a rotation angle about an axis of a direction normal to a plane formed by an axis of the gravity direction and an axis of the horizontal direction in the space in which the information processing apparatus exists.

10. The non-transitory computer-readable storage medium having the information processing program stored therein according to claim 1, wherein
the computer is caused to further provide functionality comprising object positioning for positioning a virtual object which is movable in the virtual space, and
the display control causes the display device to display a display image of the virtual object having been generated by using the virtual camera.

11. The non-transitory computer-readable storage medium having the information processing program stored therein according to claim 1, wherein the information processing program causing the computer to further provide functionality comprising:
while gradually returning from the planar view display to the stereoscopically visible display, if the value represented by the movement data representing movement of the information processing apparatus exceeds the predetermined value, stopping the gradual return from the planar view display to the stereoscopically visible display and performing planar view display of the display image.

12. A hand-held information processing apparatus, comprising:
a display controller configured to perform, by using a display device, one of a planar view display and a stereoscopically visible display, to display a display image;
a movement acquisition device configured to acquire movement data representing a movement of the information processing apparatus;
a virtual camera setter configured to set at least one of a position and/or an imaging direction of two virtual cameras disposed in a virtual space in cooperation with the movement of the information processing apparatus which is represented by the movement data;
a comparator for comparing a value represented by the movement data to a predetermined value; and
a switching device configured to switch a display of the display image performed by the display controller between the planar view display and the stereoscopically visible display, based on the results of comparison between the value represented by the movement data and the predetermined value, wherein
the display image is taken by the virtual camera(s) so as to represent the virtual space,
when the value represented by the movement data is greater than or equal to the predetermined value, the switching device is configured to immediately switch the stereoscopically visible display to the planar view display,
when the value represented by the movement data is less than the predetermined value, the switching device is configured to gradually return the planar view display to the stereoscopically visible display,
the display controller is configured to display, as the display image, an image for a left eye and an image for a right eye which have been generated by using the two virtual cameras which are spaced from each other by a predetermined distance in the virtual space when the stereoscopically visible display is performed, and
when the switching device switches the display of the display image performed by the display control by gradually changing from the planar view display to the stereoscopically visible display, the display device is configured to display, as the display image, a stereoscopically visible image including the image for the left eye and the image for the right eye having been generated, by gradually increasing the distance between the two virtual cameras.

13. The hand-held information processing apparatus according to claim 12, wherein:
the movement acquisition device comprises an angular velocity sensor providing angular velocity of rotation for each of the x, y, and z axes of the hand-held information processing apparatus;
the comparator compares each of the provided angular velocities of rotation for the x, y, and z axes to the predetermined value;
when at least one of the angular velocities of rotation for the x, y, and z axes, detected by the angular velocity sensor, is greater than or equal to the predetermined value, the switching device is configured to immediately switch the stereoscopically visible display to the planar view display; and when each of the angular velocities of rotation for the x, y, and z axes, detected by the angular velocity sensor, is less than the predetermined value, the switching device is configured to gradually switch from the planar view display to the stereoscopically visible display.

14. The hand-held information processing apparatus according to claim 13, wherein the display controller is further configured to:
position a virtual object, which is movable in the virtual space, based on the angular velocities of rotation for the x, y, and z axes detected by the angular velocity sensor; and
display on the display device a display image of the virtual object having been generated by using the virtual cameras.

15. The hand-held information processing apparatus according to claim 13, wherein:
while the switching device gradually returns from the planar view display to the stereoscopically visible display, if the value represented by at least one of the angular velocities of rotation for the x, y, and z axes exceeds the predetermined value, the switching device is configured to stop the gradual return from the planar view display to the stereoscopically visible; and
when each of the angular velocities of rotation for the x, y, and z axes, detected by the angular velocity sensor, is less than the predetermined value, the switching device is configured to recommence gradually returning from the planar view display to the stereoscopically visible display.

16. The hand-held information processing apparatus according to claim 12, wherein:
the display controller is further configured to calculate, based on the acquired movement data representing the movement of the hand-held information processing apparatus, a rotation angle about an axis of a horizontal direction in a space in which the hand-held information processing apparatus is provided;
when the display device performs stereoscopically visible display, the virtual camera setter is further configured to set the distance between the virtual cameras based on the calculated rotation angle about the axis of the horizontal direction, wherein the distance between the virtual cameras is set to:
an upper limit when the calculated rotation angle is zero,
a lower limit when the calculated rotation angle is above a rotation threshold, and
a distance that is proportional to the calculated rotation angle when the rotation angle is between zero and the rotation threshold.

17. The hand-held information processing apparatus according to claim 12, wherein the switching device is configured to gradually switch from the planar view display to the stereoscopically visible display by gradually increasing the distance between the two virtual cameras to a predetermined upper virtual camera distance within a predetermined time limit.

18. The hand-held information processing apparatus according to claim 12, wherein:
the display controller is further configured to calculate, based on the acquired movement data representing the movement of the hand-held information processing apparatus, a rotation angle about an axis of a horizontal direction in a space in which the hand-held information processing apparatus is provided, and when the stereoscopically visible display is performed, the virtual cameras are spaced from each other in accordance with the calculated rotation angle.

19. An information processing method performed by a hand-held information processing apparatus including a display device, the information processing method comprising:
acquiring movement data representing a movement of the information processing apparatus;
setting, using a computer processor, at least one of a position and/or an imaging direction of two virtual cameras disposed in a virtual space in cooperation with the movement of the information processing apparatus which is represented by the movement data;
comparing a value represented by the movement data to a predetermined value; and
switching a display of a display image between a planar view display and a stereoscopically visible display, based on the results of comparison between the value represented by the movement data and the predetermined value, wherein
the display of the display image is performed by a display controller for performing, by using the display device, one of the planar view display and the stereoscopically visible display,
the display image is taken by the virtual camera(s) so as to represent the virtual space,
when the value represented by the movement data is greater than or equal to the predetermined value, the stereoscopically visible display is immediately switched to the planar view display,
when the value represented by the movement data is less than the predetermined value, the planar view display is gradually switched to the stereoscopically visible display,
the display controller displays, as the display image, an image for a left eye and an image for a right eye which have been generated by using the two virtual cameras which are spaced from each other by a predetermined distance in the virtual space when the stereoscopically visible display is performed, and
when switching the display of the display image performed by the display control by gradually changing from the planar view display to the stereoscopically visible display, displaying, as the display image, a stereoscopically visible image including the image for the left eye and the image for the right eye having been generated, by gradually increasing the distance between the two virtual cameras.

20. A hand-held information processing system, comprising:
a computer processing system, including at least one computer processor, the computer processing system being configured to provide functionality comprising:
display control for performing, by using a display device, one of a planar view display and a stereoscopically visible display, to display a display image;
movement acquisition for acquiring movement data representing a movement of the information processing apparatus;
virtual camera setting for setting at least one of a position and/or an imaging direction of two virtual cameras disposed in a virtual space in cooperation with the movement of the information processing apparatus which is represented by the movement data;
comparison for comparing a value represented by the movement data to a predetermined value; and switching display control for switching a display of the display image performed by the display control between the planar view display and the stereoscopically visible display, based on the results of comparison between the value represented by the movement data and the predetermined value, wherein the display image is taken by the virtual camera(s) so as to represent the virtual space, when the value represented by the movement data is greater than or equal to the predetermined value, the stereoscopically visible display is immediately switched to the planar view display, when the value represented by the movement data is less than the predetermined value, the planar view display is gradually switched to the stereoscopically visible display, the display control displays, as the display image, an image for a left eye and an image for a right eye which have been generated by using the two virtual cameras which are spaced from each other by a predetermined distance in the virtual space when the stereoscopically visible display is performed, and when the switching switches the display of the display image performed by the display control by gradually changing from the planar view display to the stereoscopically visible display, the display device is caused to display, as the display image, a stereoscopically visible image including the image for the left eye and the image for the right eye having been generated, by gradually increasing the distance between the two virtual cameras.

21. A hand-held information processing apparatus, comprising:
a display;
an angular velocity sensor;
a processing system, comprising at least one processor, the processing system coupled to the display and the motion sensor and being configured to:
receive, from the angular velocity sensor, angular velocities of rotation about the x, y, and z-axes in a space in which the hand-held information processing apparatus is provided;
calculate, based on the received angular velocities of rotation about the x, y, and z-axes, an orientation and/or a motion of the hand-held information processing apparatus;
set a position and an imaging direction of a pair of virtual cameras in a virtual space in accordance with the calculated orientation and/or the motion of the hand-held information processing apparatus;
display, on the display, images captured by one or both cameras of the pair of virtual cameras using a planar view display or a stereoscopically visible display providing an image for a left eye and an image for a right eye generated by using the pair of virtual cameras;
change a distance between the pair of virtual cameras in the virtual space in accordance with at least one of the angular velocities of rotation about the x, y, and z-axes;
compare each of the angular velocities of rotation about the x, y, and z-axes to a predetermined value; and
switch the display of the images captured by one or both cameras of the pair of virtual cameras between the planar view display and the stereoscopically visible display based on the result of comparison between the angular velocities of rotation about the x, y, and z-axes and the predetermined value, wherein
when the images captured by one or both cameras of the pair of virtual cameras are displayed using stereoscopically visible display and at least one of the angular velocities of rotation about the x, y, and z-axes is greater than the predetermined value, the display of the images captured by one or both cameras of the pair of virtual cameras is immediately switched to planar view display; and
when the images captured by one or both cameras of the pair of virtual cameras are displayed using planar view display and each of the angular velocities of rotation about the x, y, and z-axes is less than the predetermined value, the display of the images captured by one or both cameras of the pair of virtual cameras is gradually switched to stereoscopically visible display by gradually increasing the distance between the pair of virtual cameras.

22. The hand-held information processing apparatus according to claim 21, wherein the processing system gradually switches from the planar view display to the stereoscopically visible display by gradually increasing the distance between the two virtual cameras to a predetermined upper virtual camera distance within a predetermined time.

* * * * *